INVENTOR
RUDOLPH FRANK STEHLIK
BY
ATTORNEY.

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 2

INVENTOR
RUDOLPH FRANK STEHLIK

BY Chas. W. Candy

ATTORNEY.

March 11, 1952

R. F. STEHLIK 2,588,686

TELEPHONE SYSTEM PROVIDING OPERATOR SERVICE WHEN ALL TRUNKS ARE BUSY

Filed May 7, 1947

22 Sheets-Sheet 3

INVENTOR
RUDOLPH FRANK STEHLIK

BY Chas. W. Candy

ATTORNEY.

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 4

INVENTOR
RUDOLPH FRANK STEHLIK

BY Chas. W. Comly

ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 5

RUDOLPH FRANK STEHLIK
INVENTOR

BY Chas. W. Candy
ATTORNEY.

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 6

INVENTOR
RUDOLPH FRANK STEHLIK

BY Chas. W. Candy.

ATTORNEY.

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 7

INVENTOR
RUDOLPH FRANK STEHLIK

BY Chas. Tu. Candy

ATTORNEY

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 8

INVENTOR
RUDOLPH FRANK STEHLIK

BY Chas. Tec. Candy.

ATTORNEY.

March 11, 1952 R. F. STEHLIK 2,588,686
TELEPHONE SYSTEM PROVIDING OPERATOR
SERVICE WHEN ALL TRUNKS ARE BUSY
Filed May 7, 1947 22 Sheets-Sheet 9

INVENTOR
RUDOLPH FRANK STEHLIK
BY [signature]
ATTORNEY.

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 10

INVENTOR
RUDOLPH FRANK STEHLIK

BY Chas. Tu. Candy
ATTORNEY.

INVENTOR
RUDOLPH FRANK STEHLIK
BY Chas. W. Cardy
ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 12

INVENTOR
RUDOLPH FRANK STEHLIK

BY Chas. Fr. Candy
ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 13

INVENTOR
RUDOLPH FRANK STEHLIK

BY Chas. W. Candy

ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 14

INVENTOR
RUDOLPH FRANK STEHLIK

BY Chas. W. Candy

ATTORNEY.

March 11, 1952 R. F. STEHLIK 2,588,686
TELEPHONE SYSTEM PROVIDING OPERATOR
SERVICE WHEN ALL TRUNKS ARE BUSY
Filed May 7, 1947 22 Sheets-Sheet 15

INVENTOR
RUDOLPH FRANK STEHLIK
BY Chas. W. Candy
ATTORNEY

March 11, 1952

R. F. STEHLIK

TELEPHONE SYSTEM PROVIDING OPERATOR SERVICE WHEN ALL TRUNKS ARE BUSY 2,588,686

Filed May 7, 1947

22 Sheets-Sheet 16

INVENTOR
RUDOLPH FRANK STEHLIK

BY Chas. W. Candy.

ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 17

INVENTOR
RUDOLPH FRANK STEHLIK

BY [signature]

ATTORNEY.

March 11, 1952 R. F. STEHLIK 2,588,686

TELEPHONE SYSTEM PROVIDING OPERATOR SERVICE WHEN ALL TRUNKS ARE BUSY

Filed May 7, 1947 22 Sheets-Sheet 18

INVENTOR
RUDOLPH FRANK STEHLIK

BY Chas. W. Candy

ATTORNEY.

INVENTOR
RUDOLPH FRANK STEHLIK

BY [signature]

ATTORNEY.

INVENTOR
RUDOLPH FRANK STEHLIK
BY Chas. W. Candy
ATTORNEY

| | 1 | 2 | 3 | 4 |
|---|---|---|---|---|
| 1 | X | X | | |
| 2 | X | | X | |
| 3 | X | | | X |
| 4 | | X | X | |
| 5 | | X | | X |
| 6 | | | X | X |
| 7 | X | | | |
| 8 | | X | | |
| 9 | | | X | |
| 0 | | | | X |

INVENTOR
RUDOLPH FRANK STEHLIK
BY Chas. W. Cardy
ATTORNEY.

INVENTOR
RUDOLPH FRANK STEHLIK
BY Chas. W. Candy
ATTORNEY

Patented Mar. 11, 1952 2,588,686

UNITED STATES PATENT OFFICE 2,588,686

TELEPHONE SYSTEM PROVIDING OPERATOR SERVICE WHEN ALL TRUNKS ARE BUSY

Rudolph Frank Stehlik, Antwerp, Belgium, assignor to Automatic Electric Laboratories, Inc., Chicago, Ill., a corporation of Delaware Application May 7, 1947, Serial No. 746,566
In Great Britain April 1, 1940

Section 1, Public Law 690, August 8, 1946
Patent expires April 1, 1960

20 Claims. (Cl. 179—7)

The present invention concerns improvements in or relating to automatic or semi-automatic telephone systems and more particularly concerns systems in which a permanent record is automatically made of particulars of a call. In such systems while the general object is to eliminate the services of an operator there are cases where the service of an operator is essential, and it is the object of the present invention to provide means which work in conjunction with the equipment which serves for the setting up of calls and for the recording thereof to enable these various supplementary manual services to be effected.

According to one feature of the invention storing arrangements are provided to enable particulars of a call to be recorded and when calls are set up from an operator's position, use is made of certain of the storing arrangements to enable the call to be set up while at the same time the recording of the call is prevented.

Another feature of the invention concerns the provision of means whereby an operator can be called by a subscriber and requested to set up the trunk call. Such means include a special register translator controlled by the operator enabling her to set up the call over routes which are also used for automatic recording.

A further feature of the invention concerns the provision of means for signalling an operator, indicating to her the calling party's number and enabling her to control the setting up of a call in the case where the junctions allocated for toll recording connections are all busy.

Figure 1:
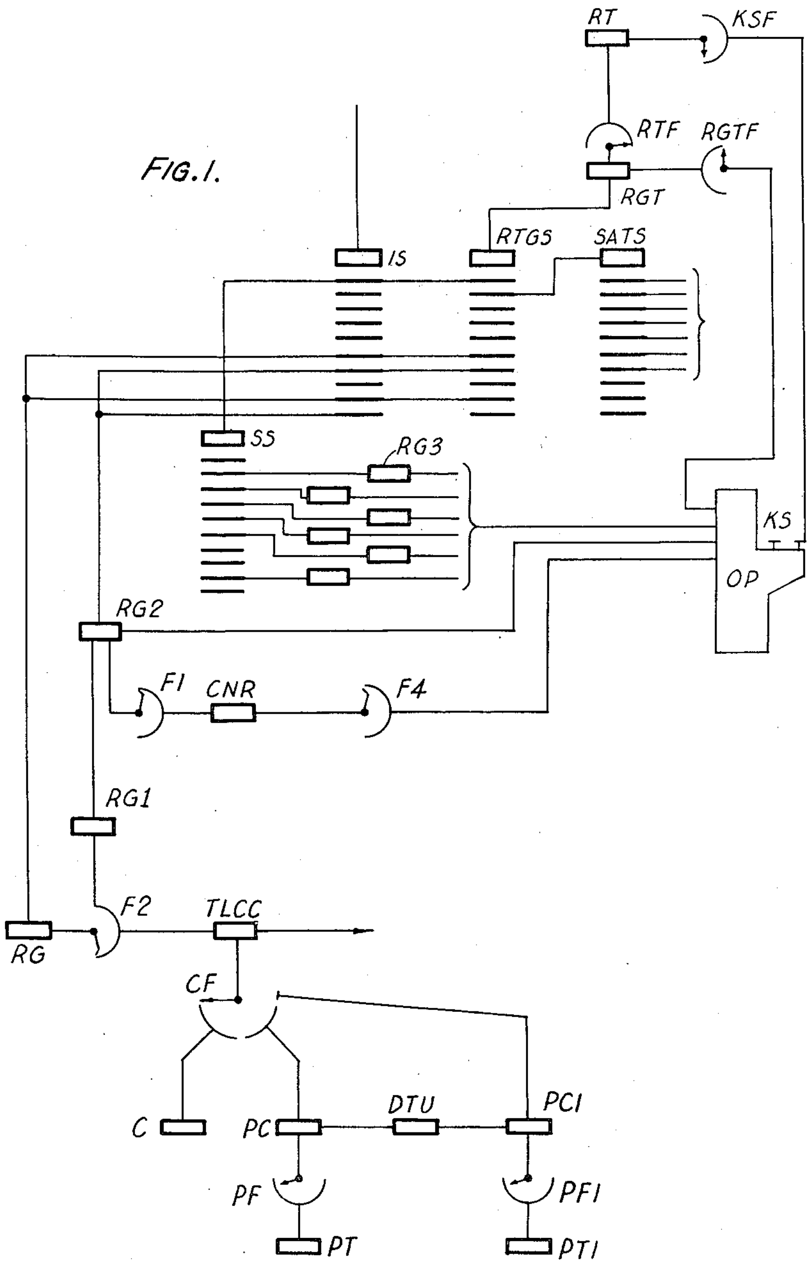
Figure 2:
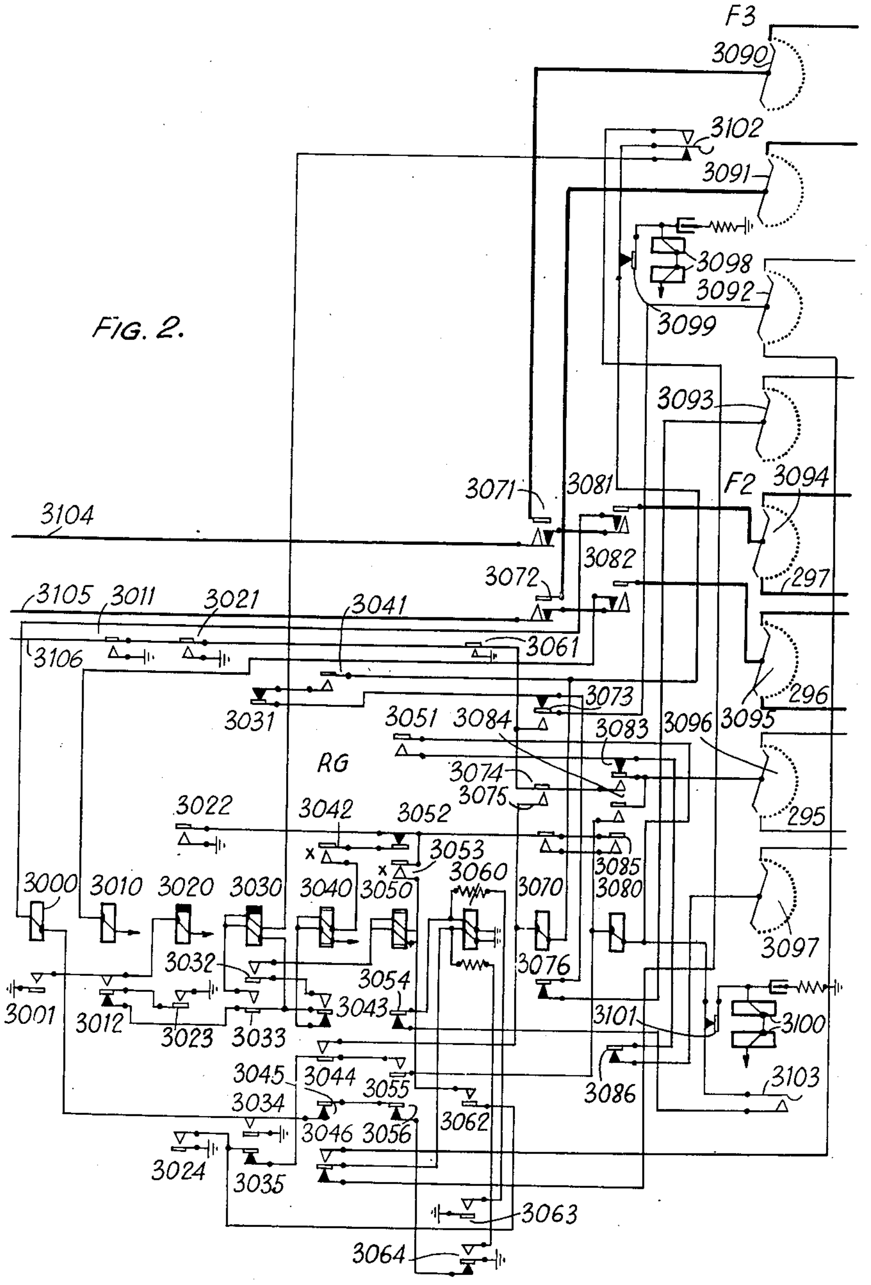
Figure 3:
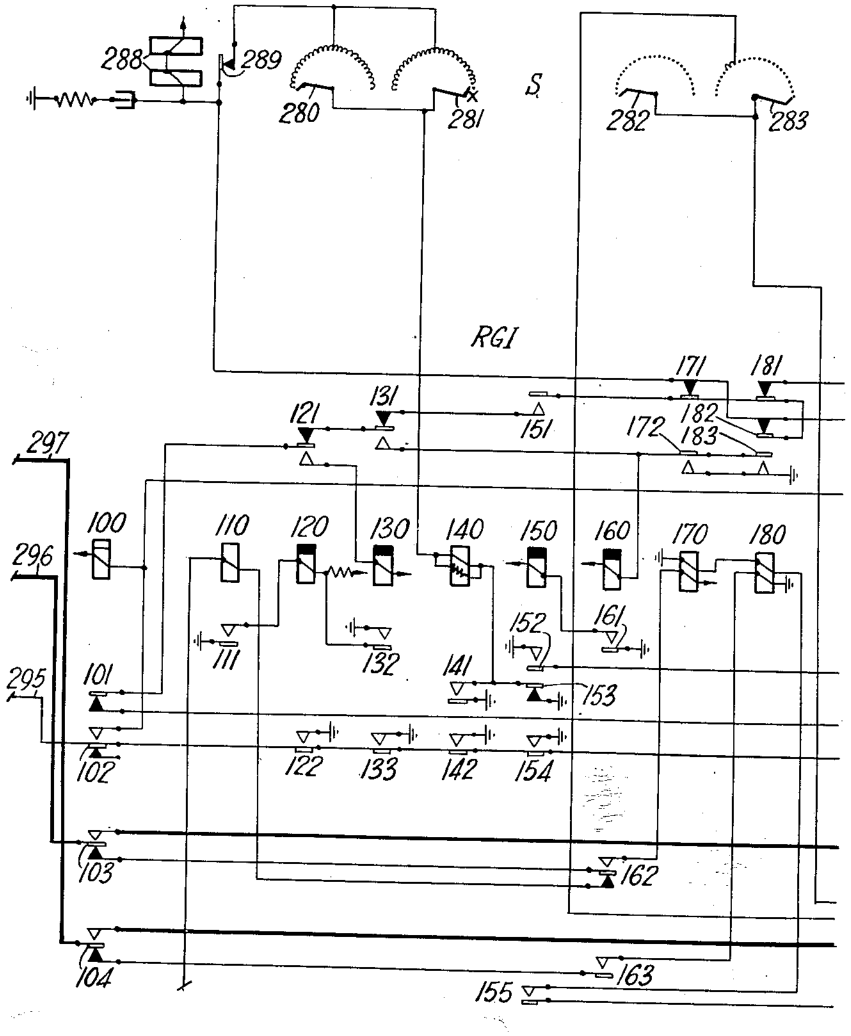
Figure 4:
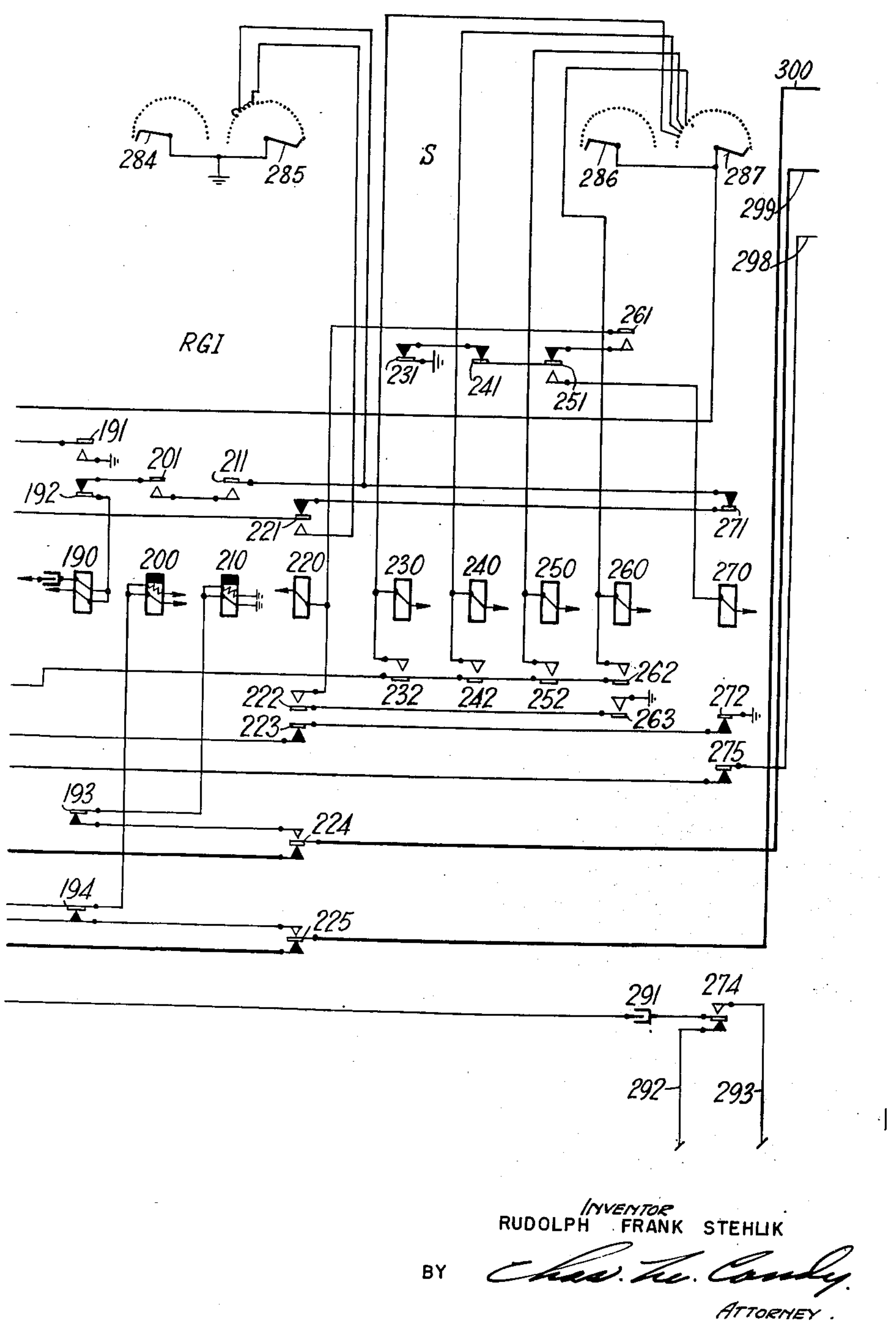
Figure 5:
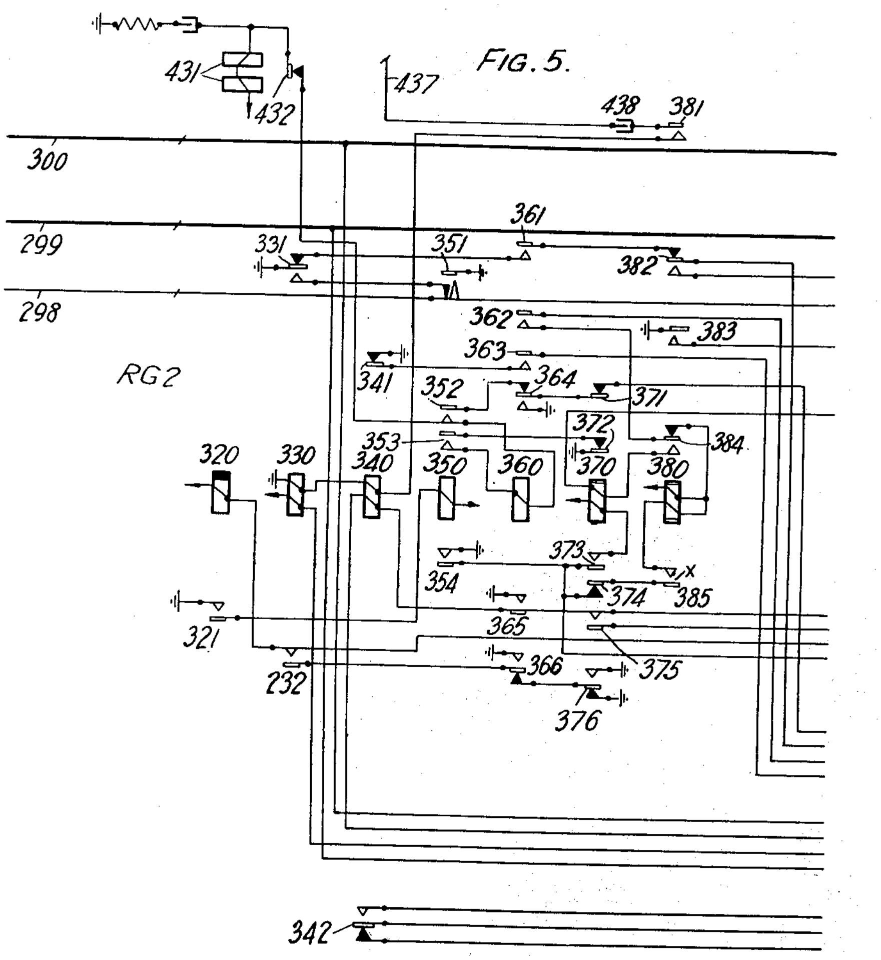
Figure 6:
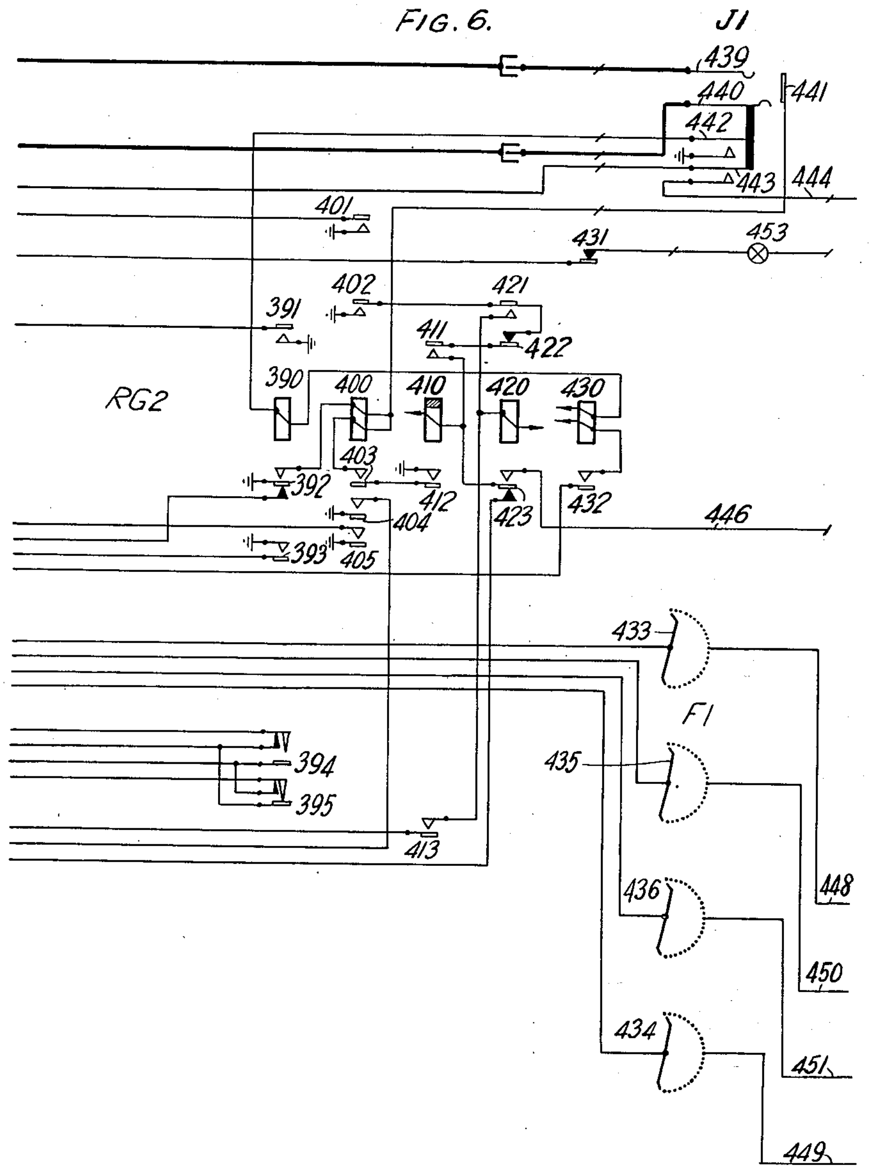
Figure 7:
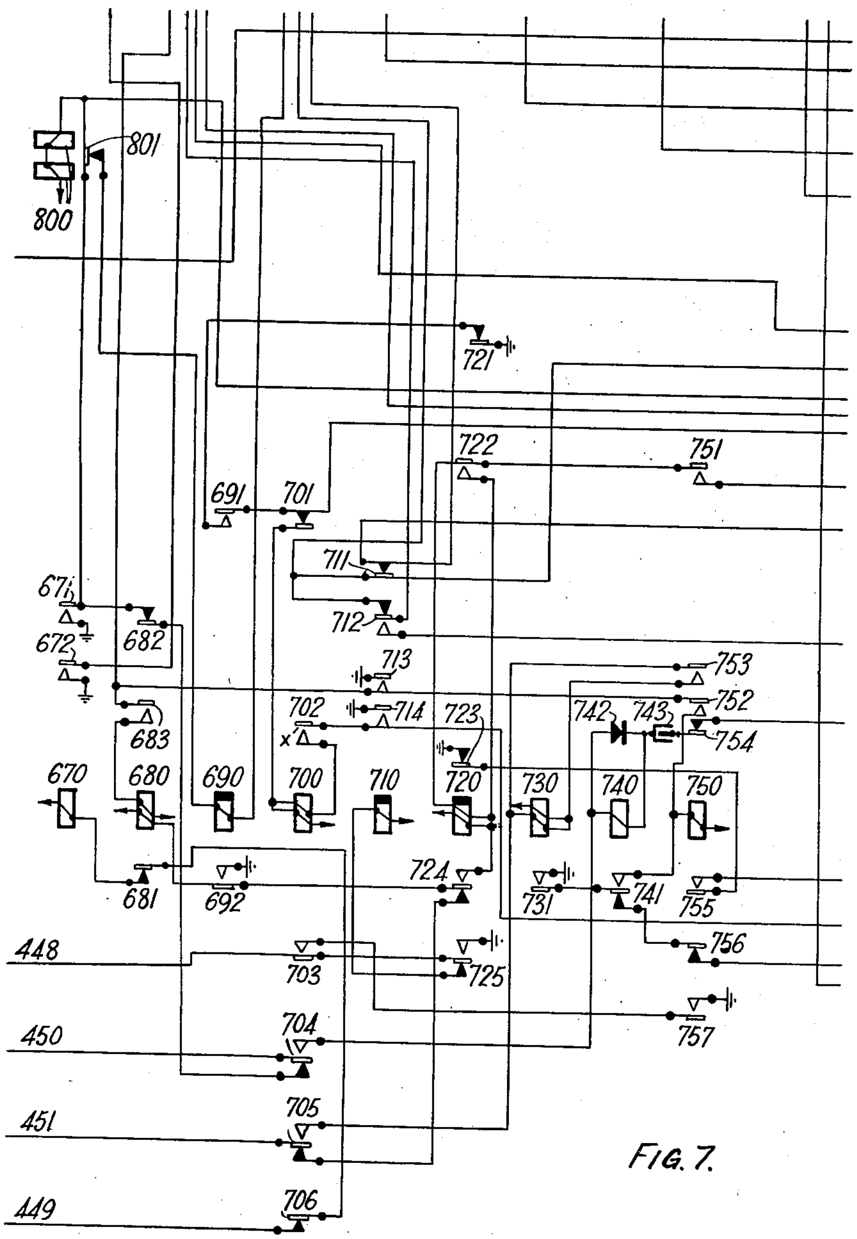
Figure 8:
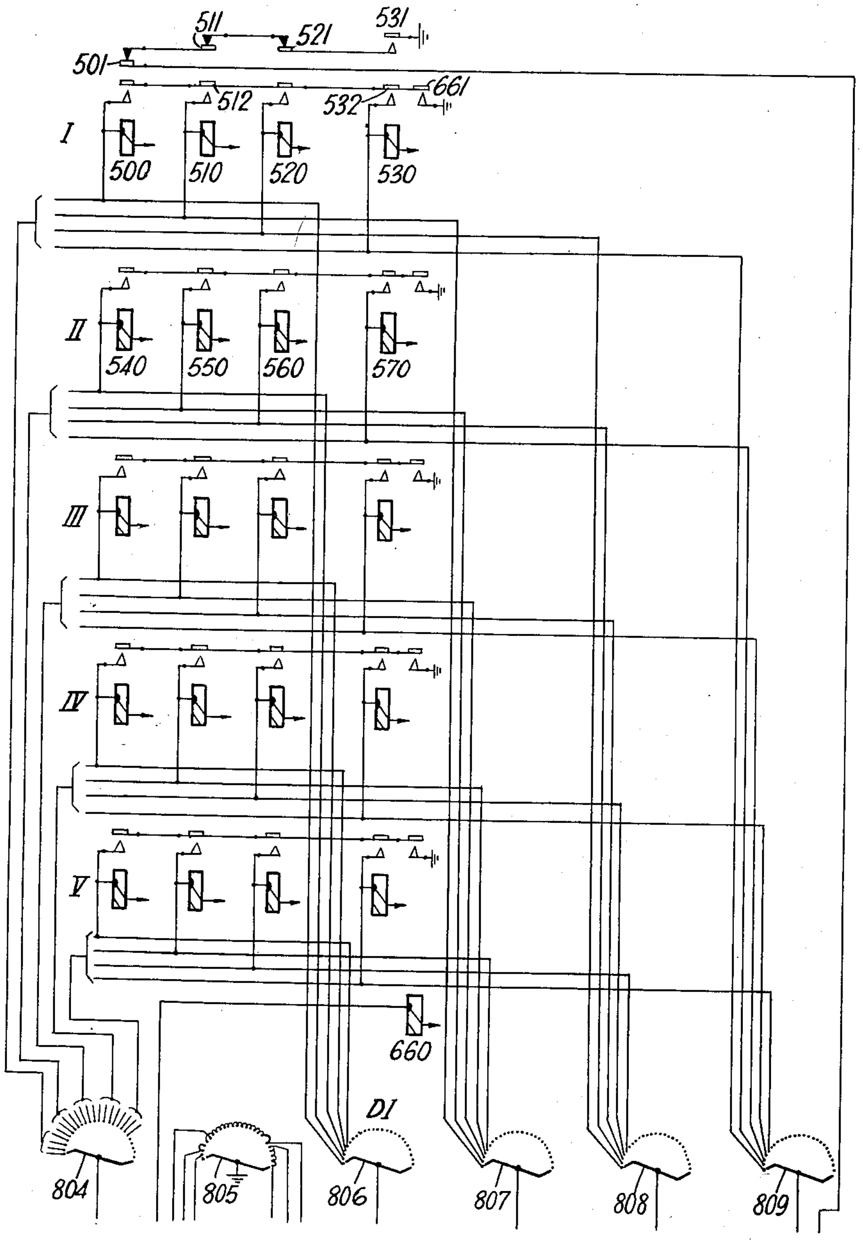
Figure 9:
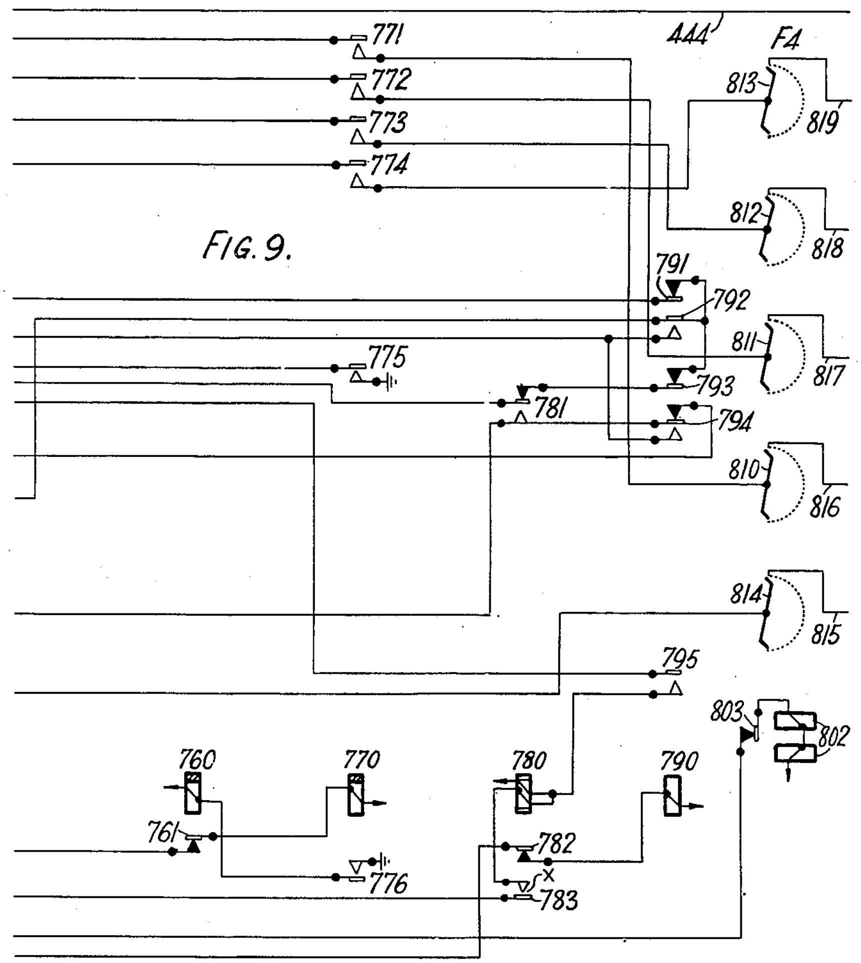
Figure 25:
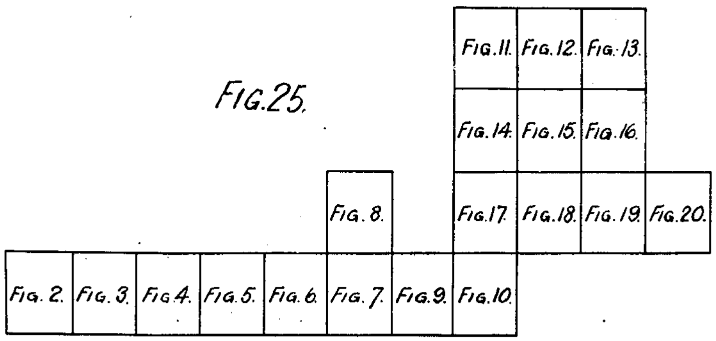
Figure 10:
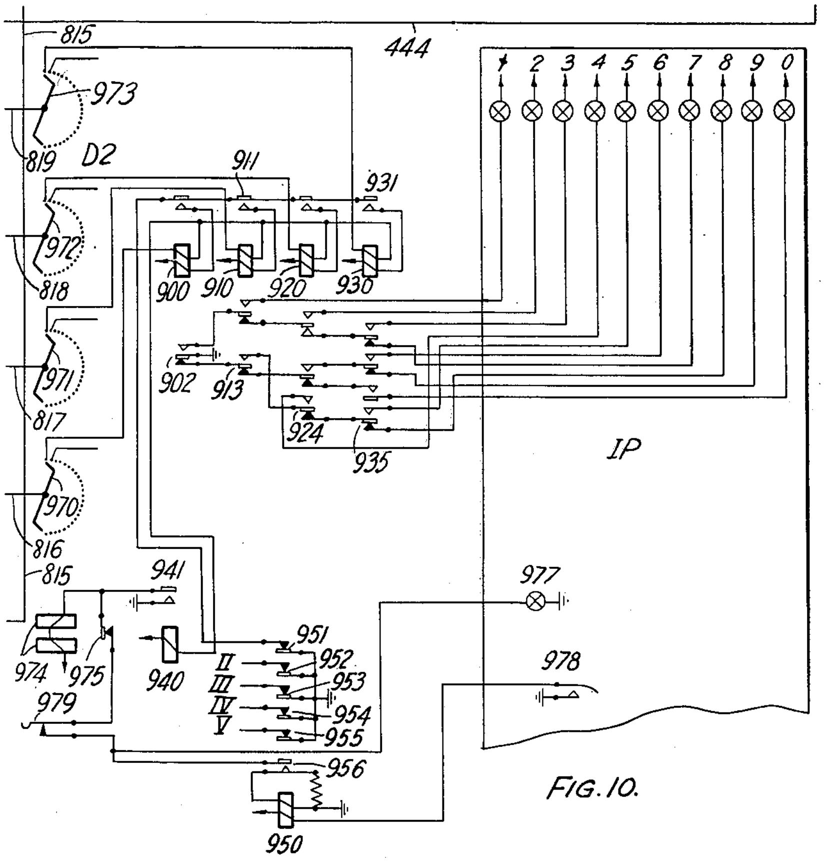
Figure 22:
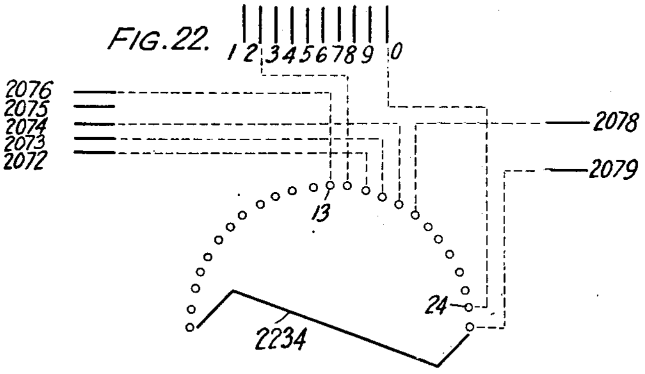
Figure 11:
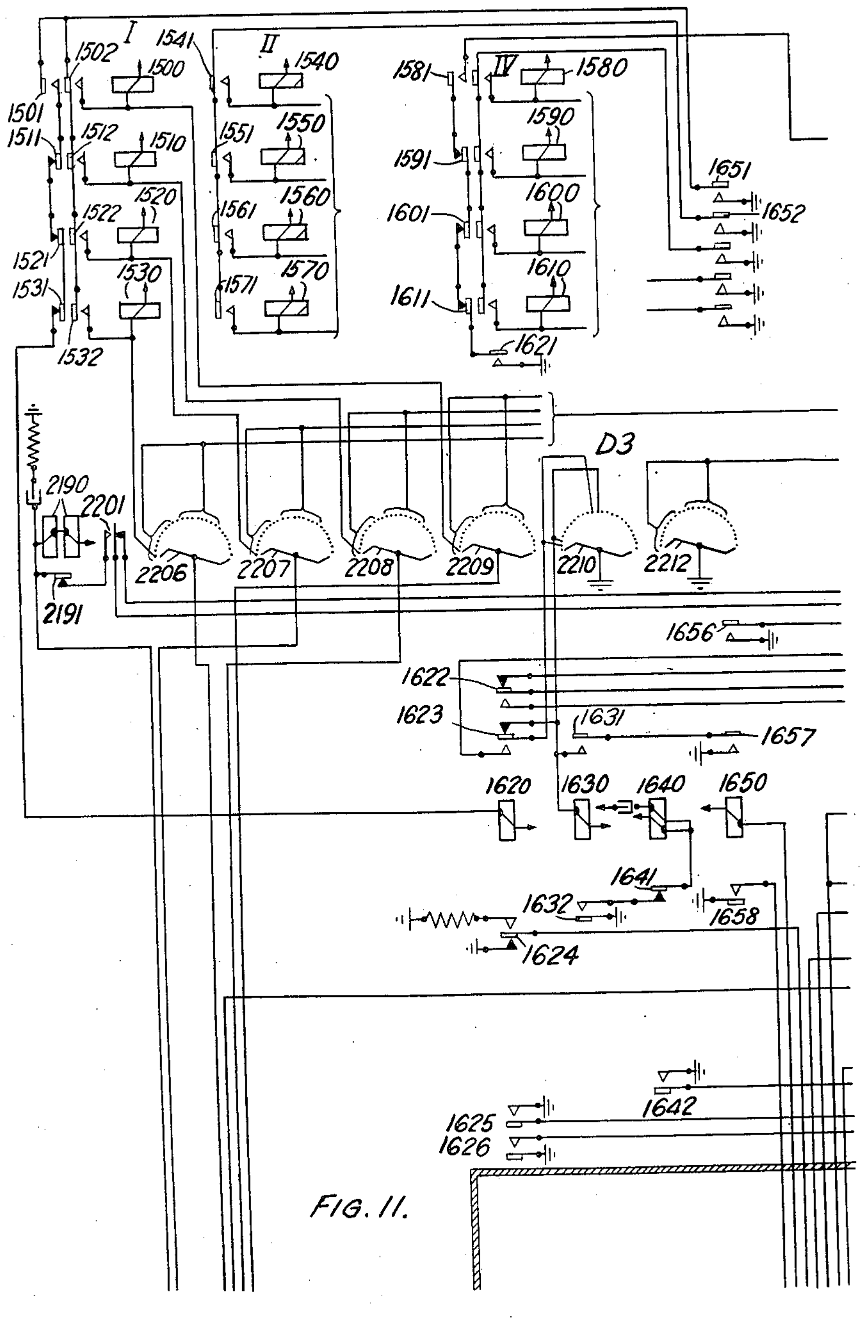
Figure 12:
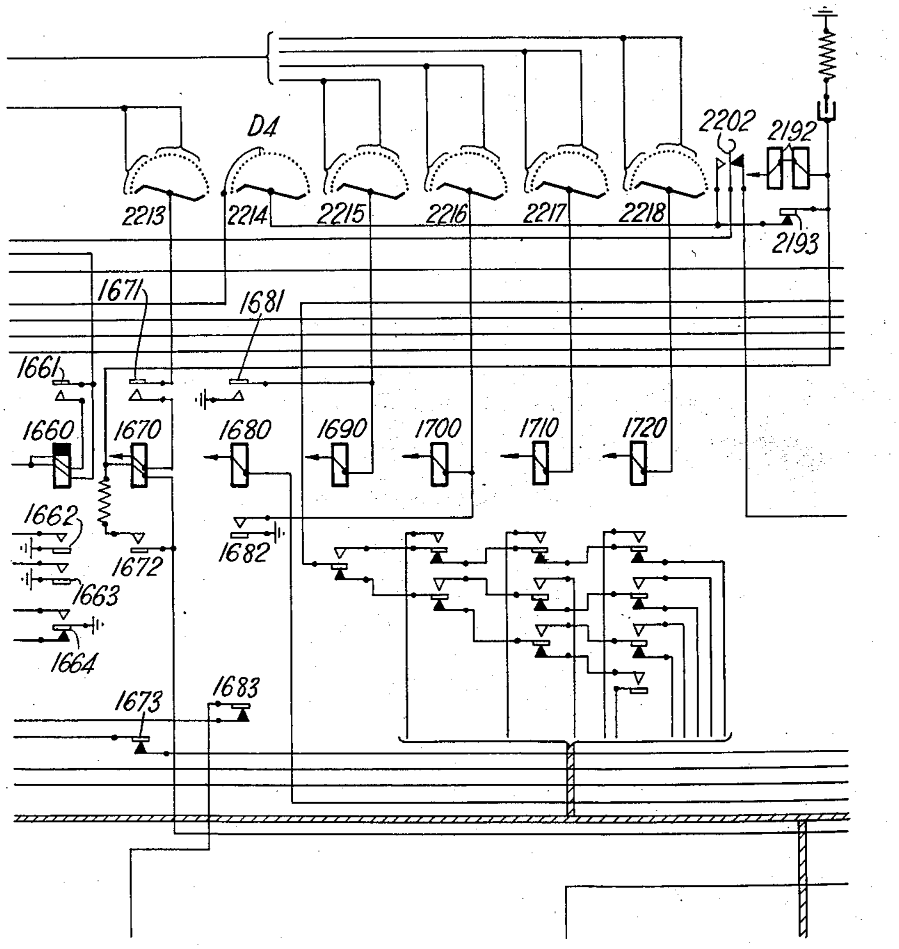
Figure 13:
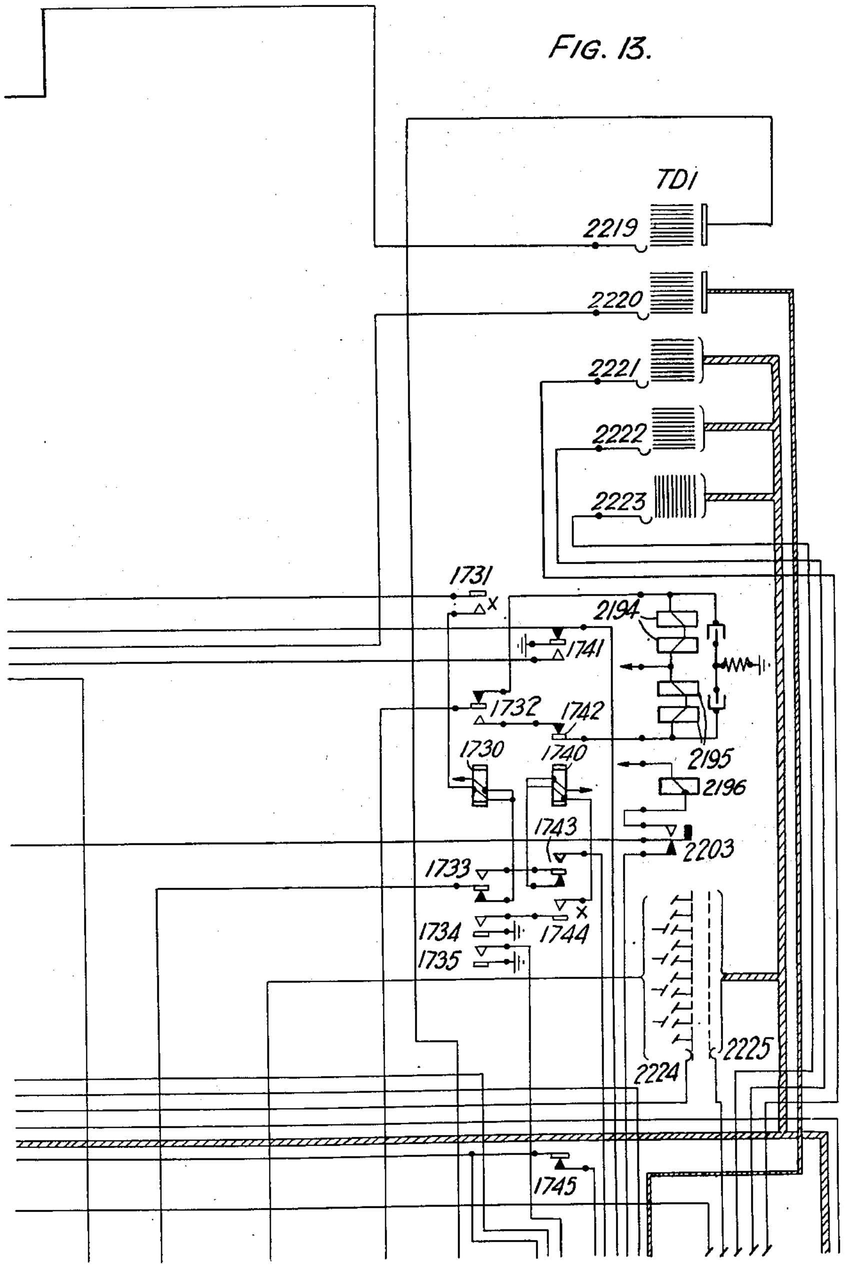
Figure 14:
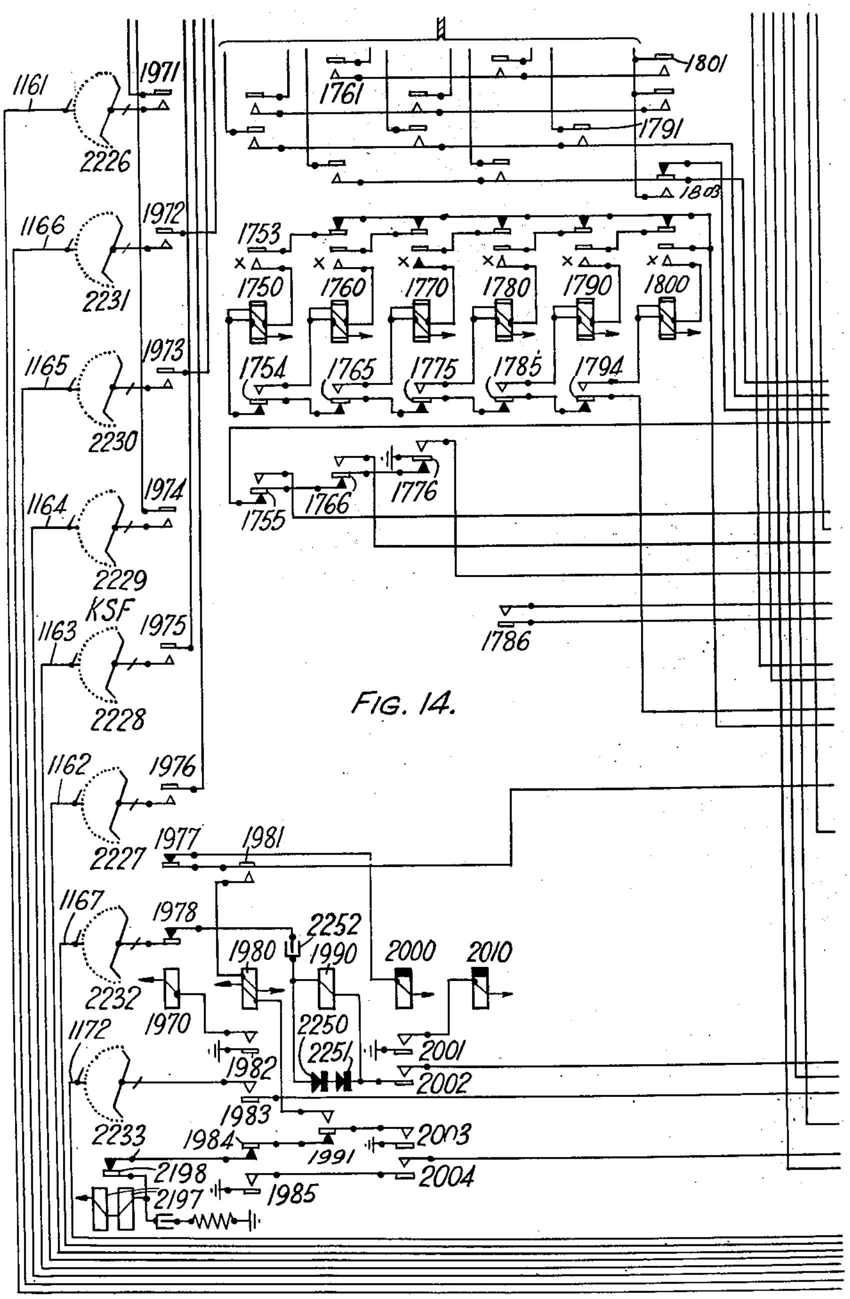
Figure 15:
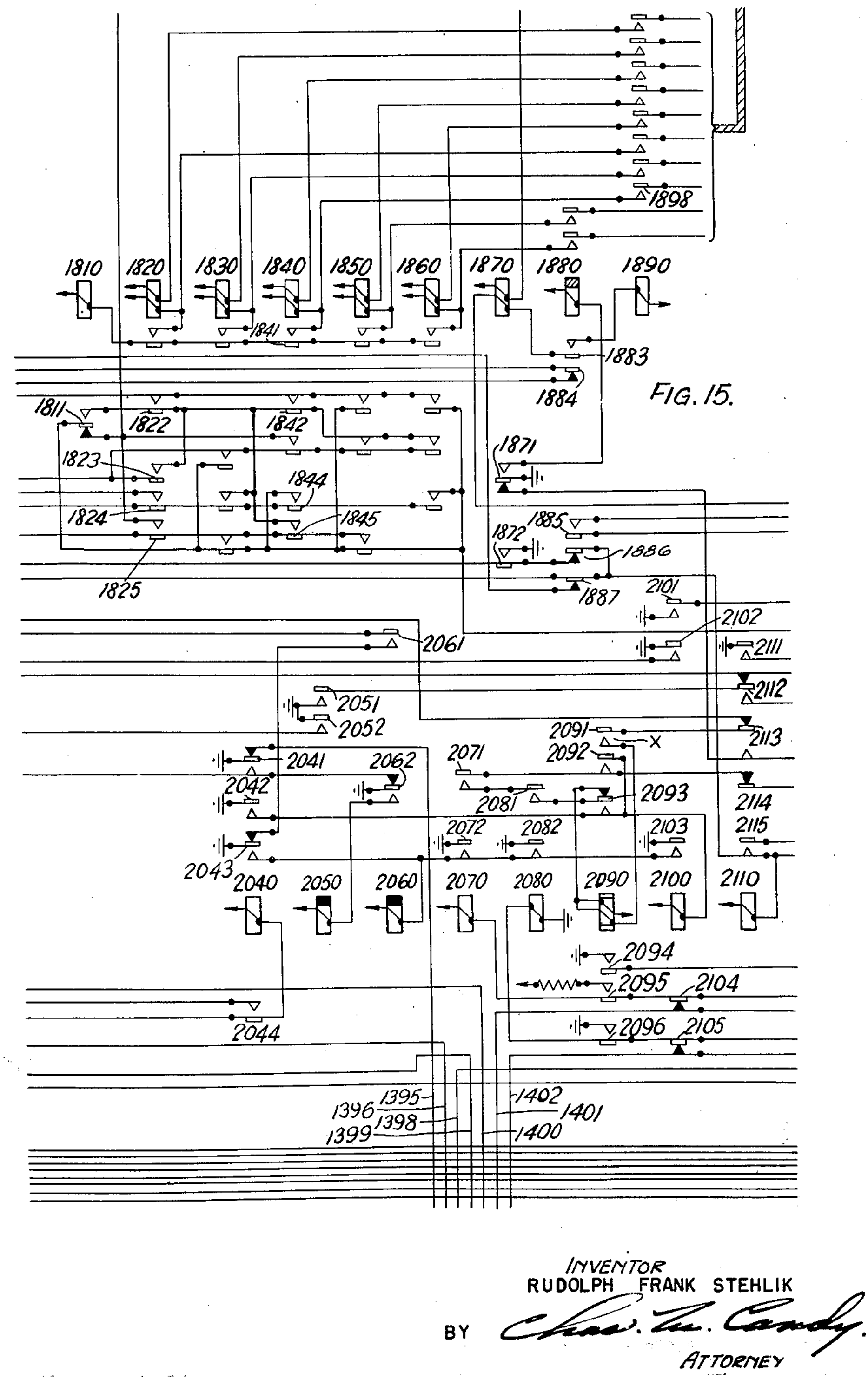
Figure 16:
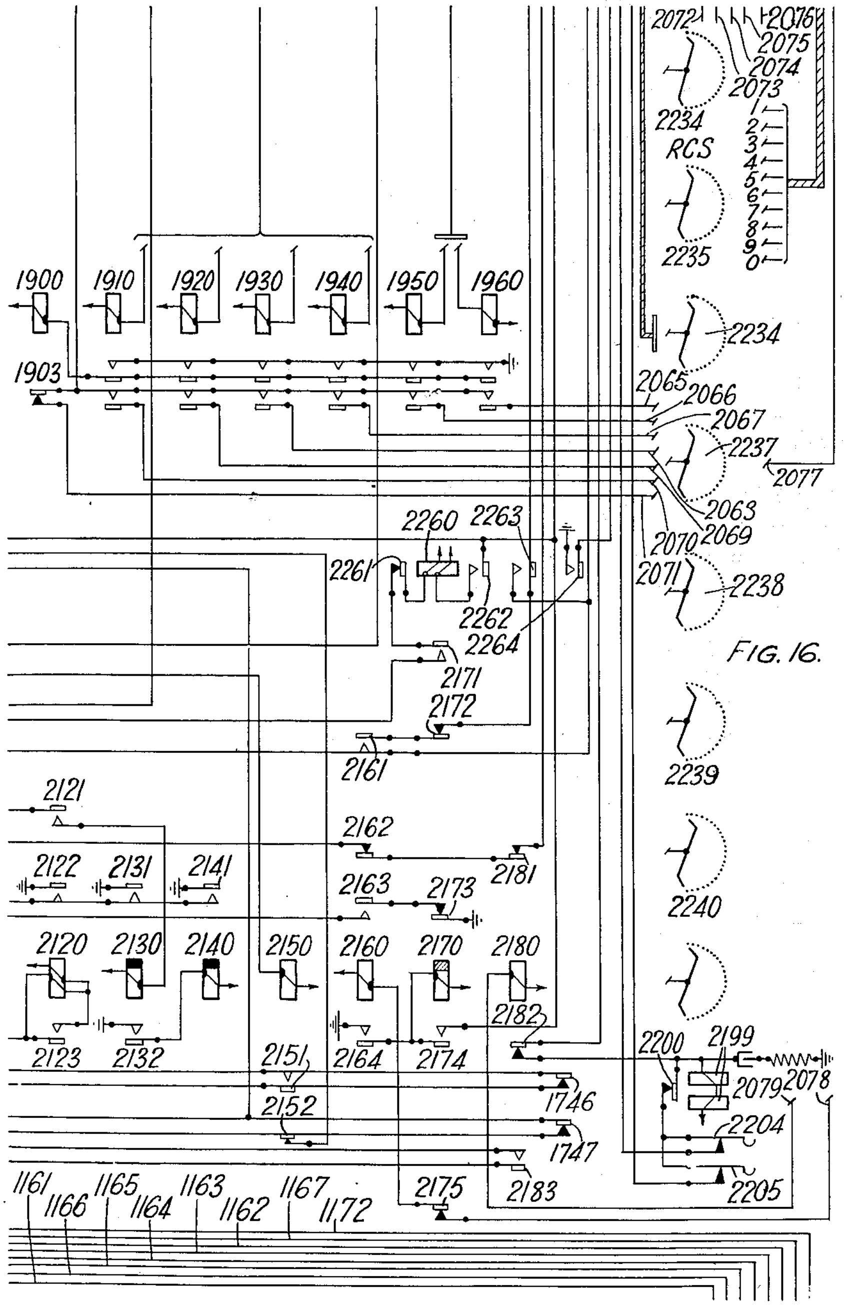
Figure 17:
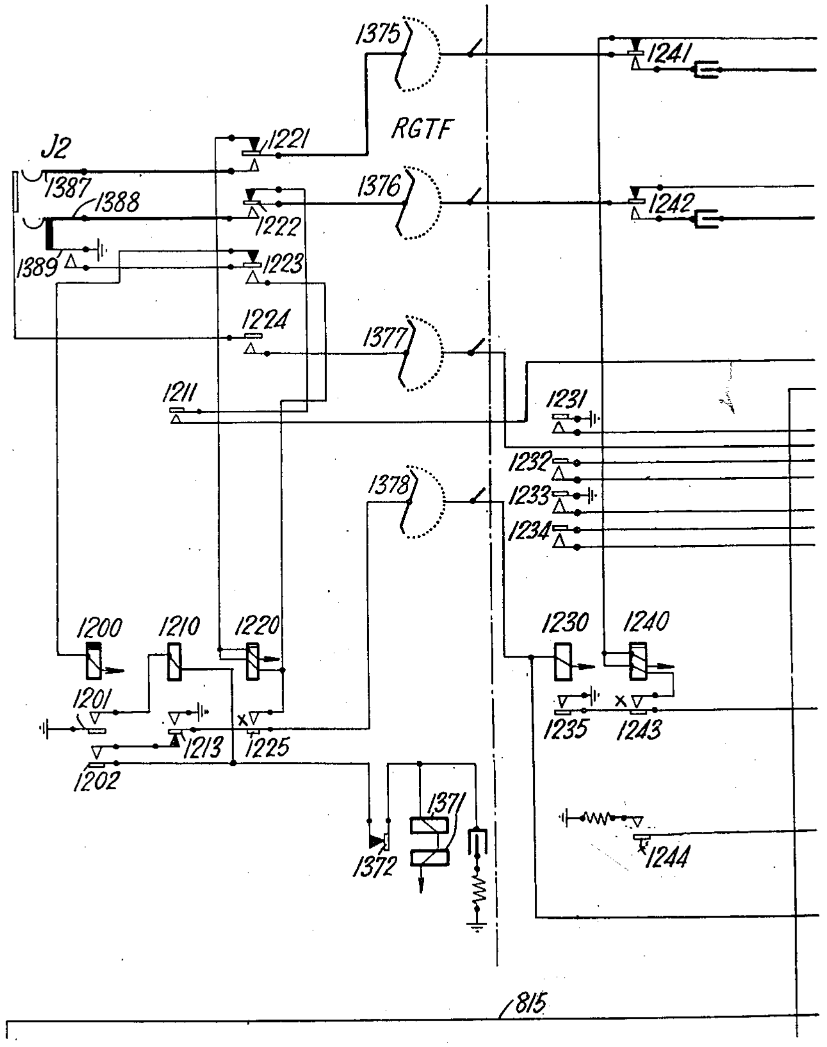
Figure 18:
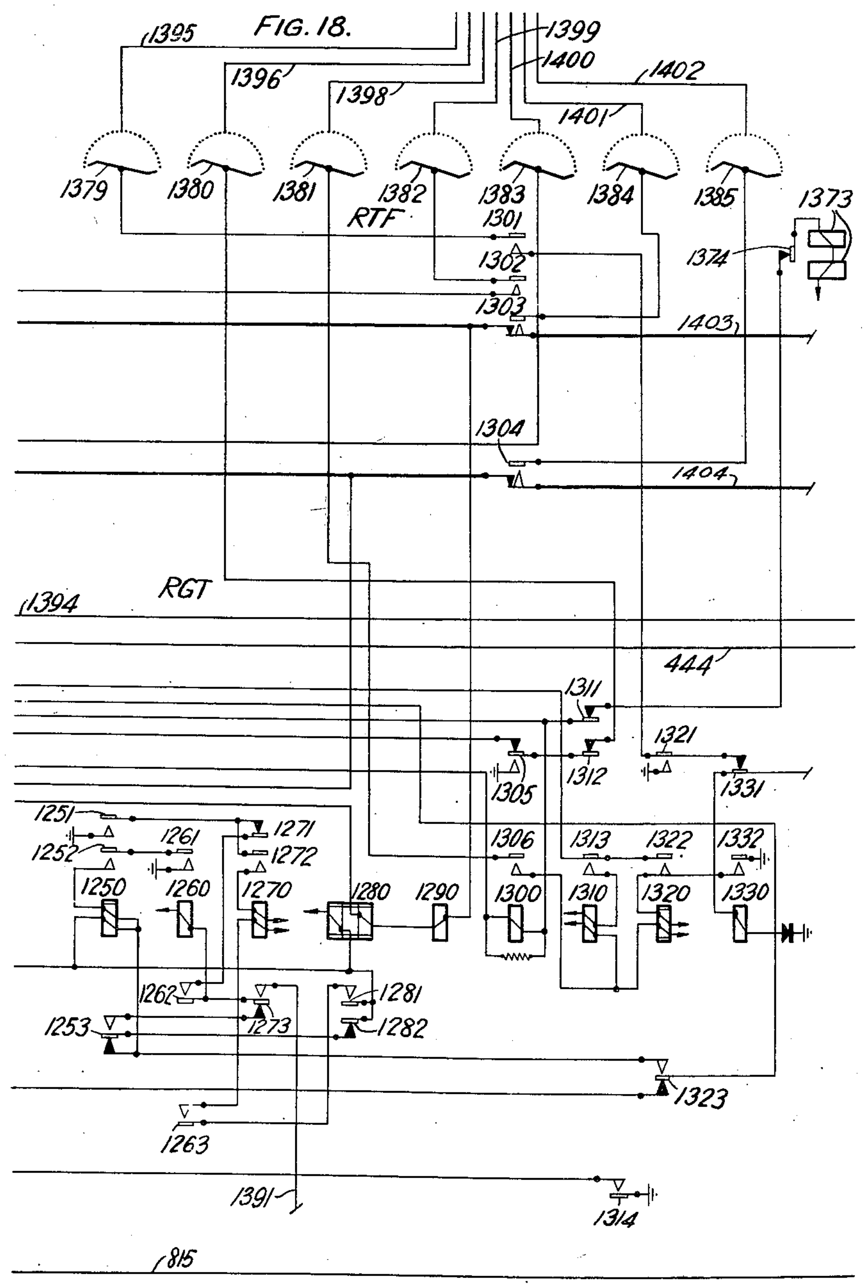
Figure 19:
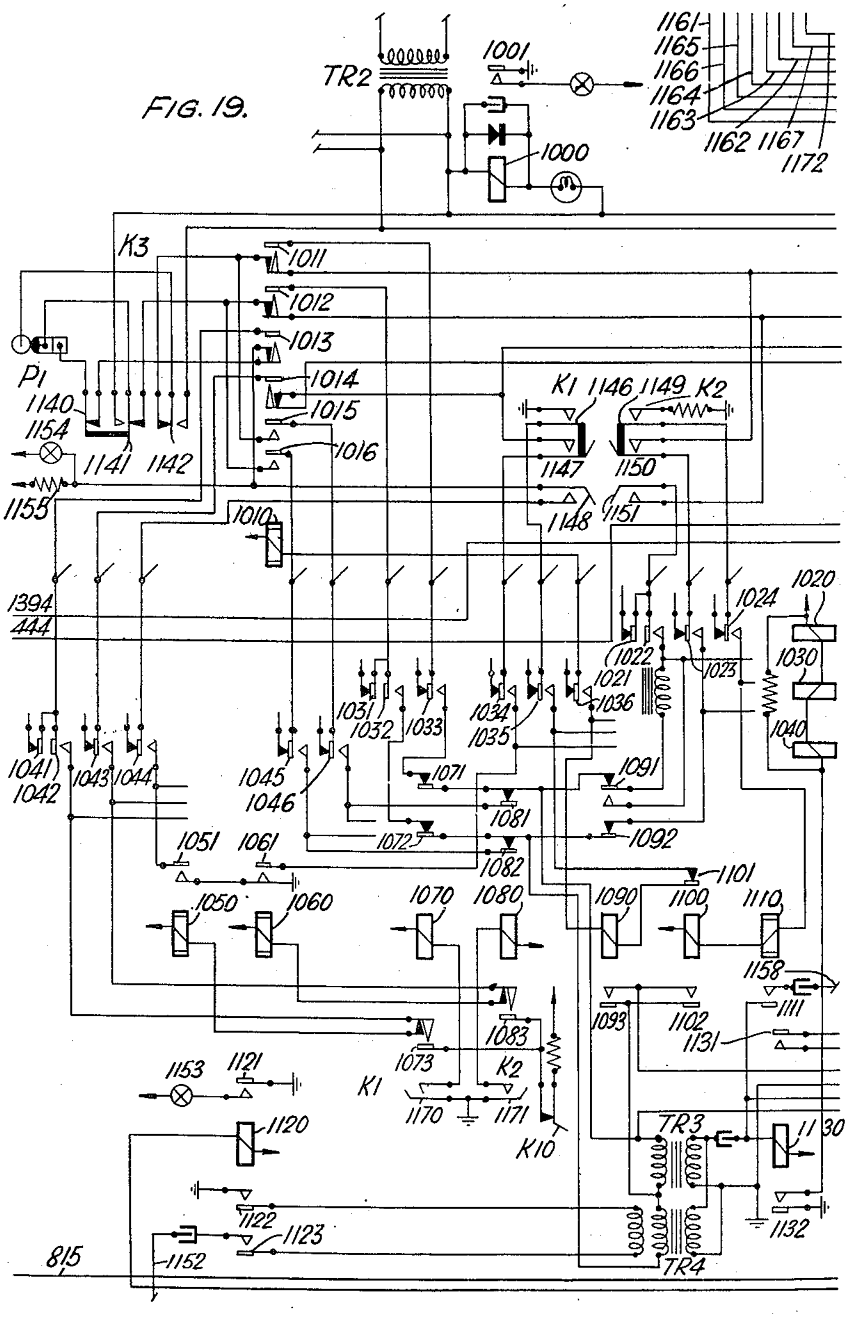
Figure 20:
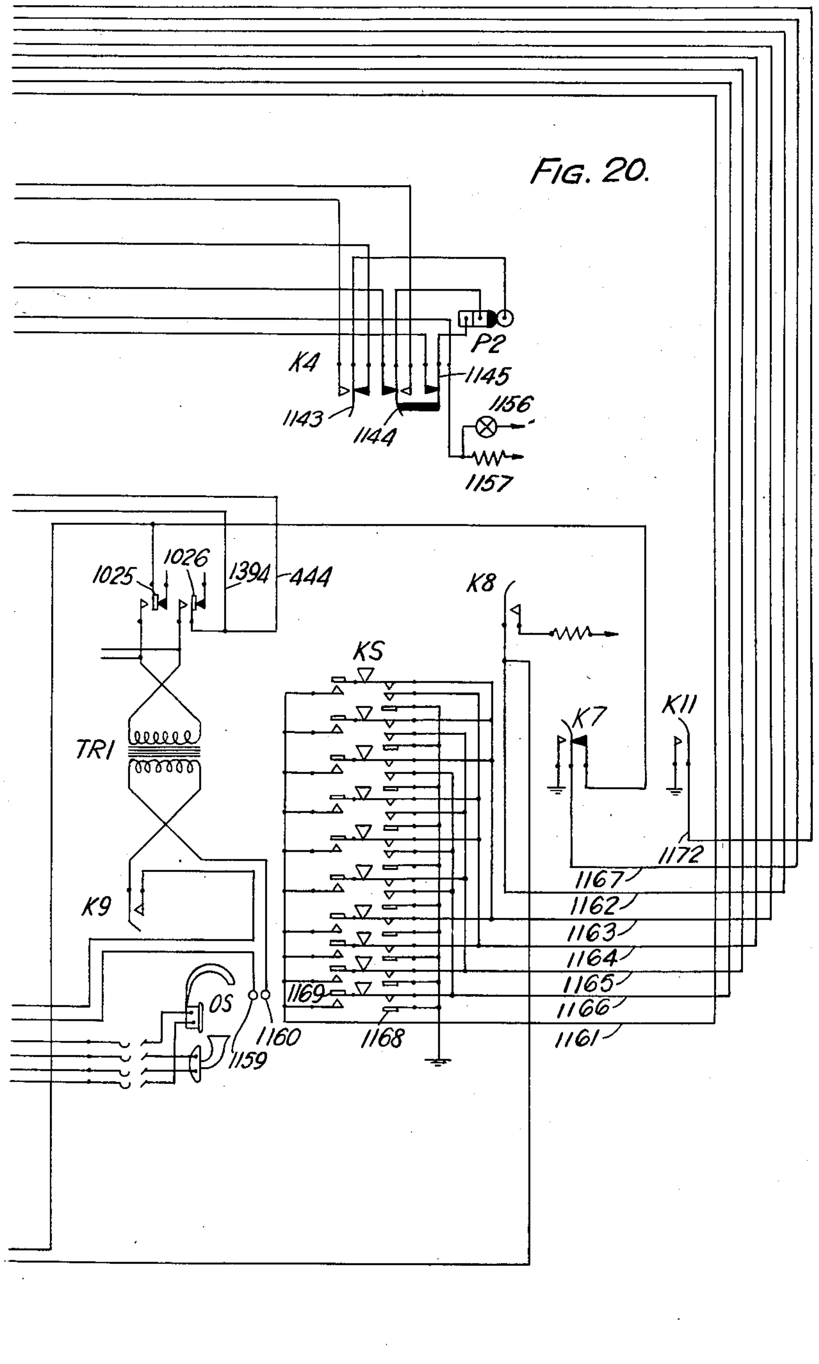
Figures 21, 23:
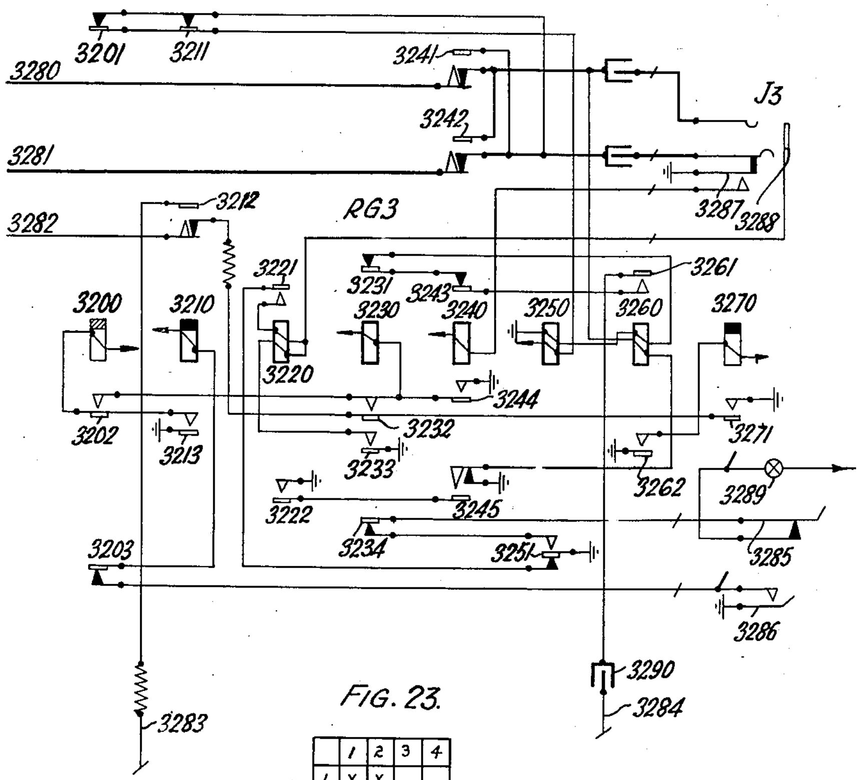
Figure 24:
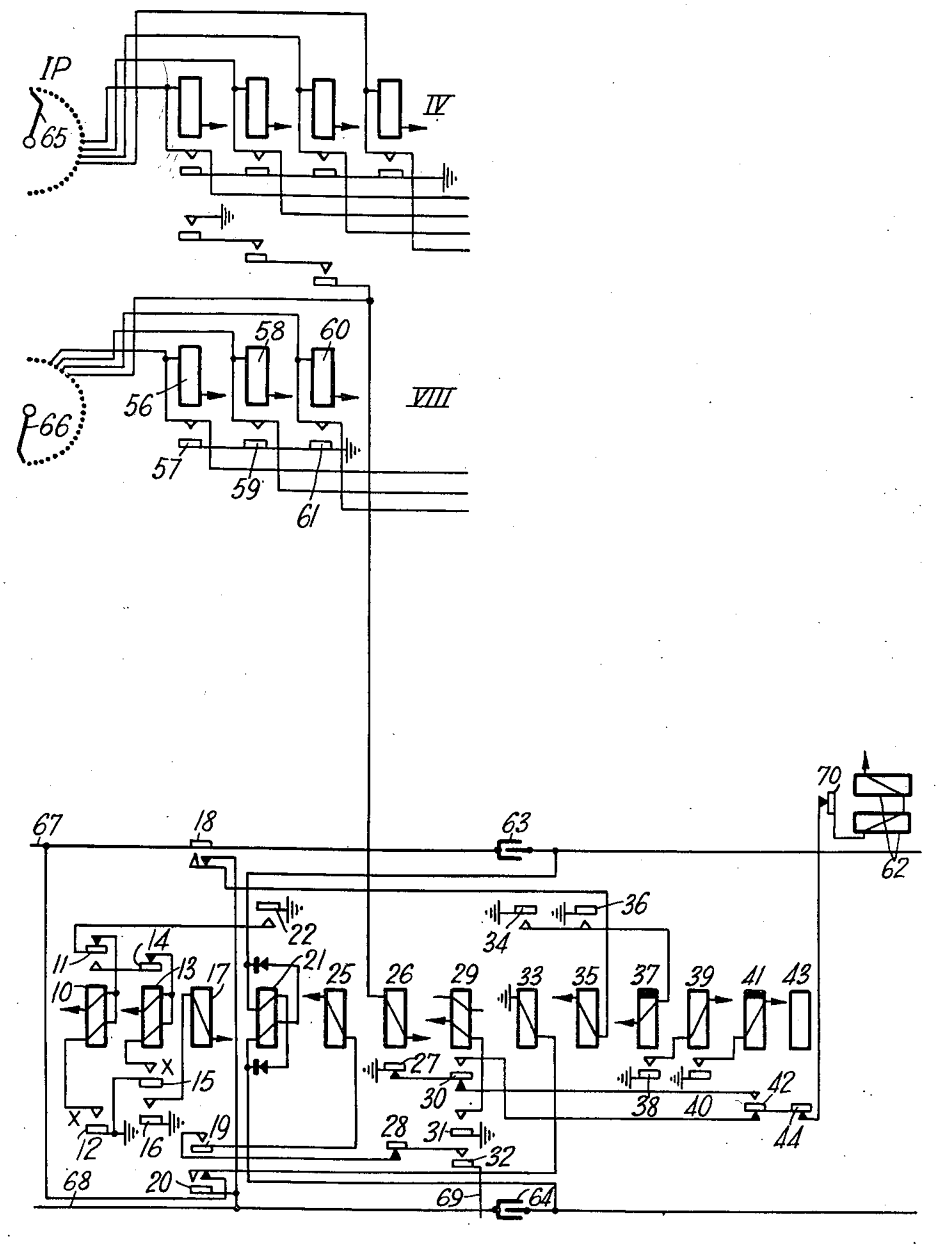

The invention will be better understood from the following description taken in conjunction with the accompanying drawings comprising Figs. 1 to 25, inclusive. More particularly, Fig. 1 shows a schematic trunking diagram of the switching apparatus included in a telephone exchange embodying the present invention; Fig. 2 shows a relay group RG and a pair of switches F2 and F3 for selecting, respectively, high and low grade junction lines or trunk lines extending to the toll line control circuits; Figs. 3 and 4 show a relay group RG1 which is selectable by the switch F2 when a junction line or trunk line is unavailable; Figs. 5 and 6 show a relay group RG2 for signalling the operator at the switchboard OP and a switch F1 for selecting an idle calling number register CNR; Figs. 7, 8 and 9 show a calling number register CNR and a switch F4 for selecting the answering operator position; Fig. 10 shows a distributor switch D2 and an indicator panel IP for displaying a calling subscriber number; Figs. 11 to 16, inclusive, show the details of a register-translator RT accessible to the answering operator position; Fig. 17 shows the details of a jack J2 and a switch RGTF having access to a plurality of relay groups; Fig. 18 shows the details of a relay group RGT and a register-translator finder RTF having access to a plurality of register-translators; Figs. 19 and 20 show the details of certain of the operator position equipment at the position OP including a cord circuit having the plugs P1 and P2 and a keyset KS for registering the digits of a desired number in a register-translator; Fig. 21 shows the details of a special service relay group RG3 which terminates in a jack J3 at the operator position and which is accessible to the special selector SS; Fig. 22 shows the cross-connections at the contact banks associated with the wiper 2234 of the route control switch RCS shown in Fig. 16; Fig. 23 shows a table illustrating the manner in which digits are transmitted in code form; Fig. 24 shows a portion of the circuits and apparatus included in the toll line control circuit TLCC; and Fig. 25 shows the mode of combining Figs. 2 to 20, inclusive, to form a unified system.

Of these drawings Fig. 1 shows the layout of part of the equipment located at the particular exchange of a zone at which the automatic recording of particulars of a call is effected. Referring to Fig. 1 a number of switches of which IS is one are provided and one of these switches is taken into use when a call is to be set up to another zone or to an operator. One only of these switches has been shown in order to simplify the drawing but it will be understood that the other switches are multipled to the switch IS. The switch IS has access over the 10th level to special service selectors such as SS, calls set up over this switch being dealt with by an operator. Over levels 2 and 5 the switch IS has access to equipment for setting up interzone calls and for automatically making a record of the particulars of the call. It is to be understood that while levels 2 and 5 are shown connected together for simplicity they will in fact have access to different sets of similar equipment. This equipment comprises a relay group RG which responds to a digit transmitted thereto from a register translator which controls the setting up of the connection. The said digit causing the relay group RG to select an appropriate grade of junction line over a finder switch such as F2. The switch F2 has access to toll line control circuits such as TLCC which are permanently associated each with a particular junction or toll line. Digits representing the called party's number are transmitted to the toll line control circuit and stored therein and also repeated over the switch CF to the register-translator or converter C which in response thereto serves to set up the connection to the called party. Further information with regard to the call is transmitted in code to the toll line control circuit and stored therein. The toll line control circuit also serves to time the call. When an effective connection is released the switch CF hunts for a printer-controller such as PC to which all the information is transferred from the toll line control circuit which together with the junction line is then released. Further information is also transferred from the date and time unit DTU to the printer-controller whch determines the total cost of the call and seizes a printer PT over the switch PF and causes the information to be printed on a ticket by the mechanism PT. A record is also made of ineffective calls by the mechanism PT1 under the control of the printer controller PC1.

If however a junction line is unavailable, the connection is extended over the last position of the switch F2 over the relay-group RG1 to the relay group RG2. The relay group RG1 determines whether the call is of sufficient importance to warrant the intervention of an operator or whether busy tone is to be returned to the calling party. In the former case the relay group RG2 causes a calling lamp to be lighted at an operator's position such as OP. In addition the relay group RG2 causes the switch F1 to hunt for an idle calling number register CNR on which the calling party's number is stored. When an operator replies, the switch F4 hunts for this position and the calling number is displayed on a panel at the position. The operator now takes particulars of the desired number and the connection is released. The operator will now endeavour to set up the connection and for this purpose she takes into use a register-translator RT over the hunting switches RGTF and RTF and the relay group RGT. The key set KS is then associated with the seized register translator over the switch KSF. She then sets up the required number on her key set and the register translator causes the switch RTGS to be raised to the 2nd or 5th level whereupon the connection is set up as described above with the exception that since the operator is setting up the call she will take the particulars in the usual way and it is thus necessary to prevent the timing of the call by the toll line control circuit and also to prevent a printer-controller or finding mechanism from being taken into use.

Returning to the switch IS it will be seen that over levels 1 and 4 the switch has direct access to the relay group RG2 so that the call is routed immediately to the operator, the calling number being displayed as previously described. This arrangement is provided to enable subscribers to have their long-distance calls set up for them by an operator if they so desire. The call is set up by the operator in the same way as described above.

It is to be noted that calls incoming over the switch IS may be set up by an operator at an originating manual exchange and in such a case the operator will take particulars of the call. Here again the toll line control circuit is prevented from effecting its normal functions of timing the call and connecting up a printer-controller and printing mechanism.

A detailed description will first be given of the circuit operations which take place when an interzone call is being set up automatically by a subscriber or an operator at an originating manual exchange. Referring to Fig. 1 it will be assumed that this call is extended over the selector switch IS to the relay group RG shown in Fig. 2. The relay group RG is adapted to receive a digit transmitted from the register-translator at the originating exchange which determines the grade of junction line which is to be taken into use the relay group having access over switches F2 and F3 to junction lines of different grades. When the relay group RG is taken into use battery is extended over conductor 3104 contacts associated with armatures 3071 and 3081, winding of relay 3000, armatures 3045, 3056, 3064 to earth. Earth potential is also extended over conductor 3105 contacts associated with armatures 3072 and 3082, winding of relay 3010 to battery.

Relays 3000 and 3010 operate and relay 3000 at armature 3001 closes a circuit for slow-to-release relay 3020. Relay 3010 at armature 3011 guards the relay group RG against further seizure and at armature 3012 closes a locking circuit for relay 3020 from earth at armature 3023. In addition relay 3020 at armature 3021 places a further guarding earth on conductor 3106.

The circuit is now in a condition to receive the digit for determining the grade of junction line which is to be employed, the digit 1 indicating that a low grade and the digit 2 that a high grade junction line is to be seized. The impulses comprising this digit are transmitted by interruptions over conductor 3105 and on the first release of relay 3010 earth is extended over armatures 3023 and 3012, lower and upper windings of relay 3030, off-normal springs 3102, interrupter contacts 3099, winding of magnet 3098 to battery. The earth is also extended over armature 3043, lower winding of relay 3040 to battery. Relay 3020 energises in the above circuit but the magnet 3098 does not. Relay 3030 at armature 3033 short-circuits its lower winding and at armature 3034 provides earth for maintaining relay 3000 in its operated position. Relay 3040 is a two-step relay and operates its "X" armature 3042 only at this time. When relay 3010 re-energises at the end of the impulse, relay 3040 energises fully over both its windings in series, armatures 3042, 3052 and 3022 to earth. It will be assumed that the digit received is the digit 1 and consequently at the end of the first impulse relay 3030 will release slowly and if the wipers of the finder switch F3 are standing on contacts leading to a busy junction line, earth will be extended back over wiper 3093, armatures 3076, 3031, 3041, interrupter contacts 3099, winding of the magnet 3098 to battery. This earth is also extended to one terminal of relay 3070, the other terminal of which is earthed over armatures 3044, 3035 and 3024. The wipers of the switch F3 are thus rotated until an idle junction is found whereupon relay 3070 operates in series with the magnet, which is not energised and conductors 3104 and 3105 are switched through over armatures 3071 and 3072 over wipers 3090 and 3091 leading to the toll line control circuit associated with the selected junction line of the required grade.

The toll line control circuit, shown in Fig. 24 is similar to that described in Ostline's application, filed June 12, 1939, Serial No. 278,727, now Patent No. 2,369,071 granted February 6, 1945, and is not shown in detail, only those parts being shown which are of interest to the present invention. The toll line control circuit is taken into use by the extension of battery over conductor 67 and earth over conductor 68 which causes the operation of relays 33 and 35 respectively, which at armatures 34 and 36 close a circuit for the slow-to-release relay 37. Relay 37, at armature 38, closes an obvious circuit for relay 39, which at armature 40 closes an obvious circuit for slow-to-release relay 41. Relay 41 in operating at armature 42 completes a circuit extending from earth at armature 27, armatures 30, 42, 44, interrupter contacts 70, winding of magnet 62 to battery. The magnet 62 is associated with a switch CF shown in Fig. 1 which has access to register translators or converters C and printer controllers PC. Since the present invention is not concerned with the operation of either of these circuits neither they nor the wipers of the switch CF have been shown in detail. It may be mentioned, however, that when the magnet 62 is energised in the above self-interrupting circuit, the wipers of the switch CF are rotated in search of an idle converter and when this occurs relay 43 operates, and at armature 44 opens the above traced circuit for the magnet 62. The toll line control circuit now received digits in code from the register translator at the originating exchange and stores the digits on groups of storage relays of which groups IV and VIII only are shown. The first digits received by the toll line control circuit and which are repeated to the converter form the called party's number. These will comprise 7 digits of which the first two represent the zone of the called party, the next two the called party's exchange and the last three the called party's number in that exchange.

The impulses are received by the toll line control circuit over conductors 67 or 68 those transmitted over conductors 67 serving to control the stepping of the wipers of the switch IP and also to cause the operation of the appropriate storage relays while those received over conductor 68 control the stepping of the wipers of the switch IP only. The earth which is transmitted over the wipers of the switch IP to cause storing of the called party's number to operate the storage relays is also extended over wipers of the switch CF to the converter to cause these digits to be repeated thereto. The remaining information transmitted to the toll line control circuit is stored therein. When the connection has been set up to the called subscriber relay 21 in the toll line control circuit operates in response to an alternating current signal and at armature 22 extends earth over armature 11, upper winding of relay 10 to battery. Relay 10 which is a two-step-relay operates its "X" armature 12 only at this time but at the end of the signal it operates fully and at armature 11 prepares a circuit for operating relay 13. This circuit is completed on the operation of relay 21 in response to an alternating current signal which is transmitted when the called party replies. Relay 13 is also a two-step relay and closes its "X" armature 15 only at this stage. At the end of the signal the relay operates fully and at armature 16 closes a circuit for relay 17 which at armatures 18 and 20 causes reverse battery supervision to be given.

The next operation of the toll line control circuit comprises the timing of the call and this is begun after a certain grace period when relay 29 operates. Relay 29 in operating locks to earth at armature 31 and at armature 32 closes a circuit from the timepulse conductor 69 over armatures 28 and 19, winding of relay 25 to battery. Earth impulses at the rate of one every five seconds are transmitted over conductor 69 and repeated by relay 25 to cause the stepping of a switch (not shown) which is adapted to record the duration of the call. When the calling party hangs up his receiver at the end of the call relays 33 and 35 release followed by relays 37, 39 and 41. The toll line control circuit remains held, however, due to a circuit which is not shown, and on the release of relay 41, the following circuit is closed: earth, armatures 27, 30 in its operated position 42, 44, interrupter contacts 70, winding of magnet 62 to battery. The wipers of the switch CF are again stepped but this time in search of an idle printer-controller and when this is found relay 43 again operates to open the above-traced circuit at armature 44. The stored information is now transferred from the toll line control circuit to the printer-controller and when this operation is complete the toll line control circuit is released. The circuits for causing the release operations are not shown since they will be understood from the previously mentioned Ostline patent.

If the call is being set up by an operator the timing and recording of the call is done by the operator and it is necessary to prevent the toll line control circuit from performing these functions. It is thus necessary to prevent relay 25 from being impulsed from conductor 69 and also to prevent the closure of the second hunting circuit for the magnet 62. Now group VIII of the storage relay groups is adapted to store a digit which is either indicative of the rate at which the call is to be charged or indicative of the fact that the call is being set up by a manual operator. The digit in the latter case is always the digit 0 and referring to Fig. 23 it will be seen that the 4th relay of the group only will be operated to store this digit. Accordingly relay 26 only is operated over wiper 66. Relay 26 in operating at armature 27 prevents the completion of the second hunting circuit for magnet 62 and at armature 28 prevents the completion of the impulsing circuit to the relay 25. As a result the timing of the call is prevented and no printer-controller is taken into use at the end of the connection. Other circuit changes also take place which enable the toll line control circuit to be released as soon as the originating operator withdraws her plug from the jack.

Returning now to the operation of the relay group RG if all the low-grade junction lines accessible over the wipers of the switch F3 are busy, the wipers of the switch F3 are rotated to contact 25 where the following circuit is closed: earth, lower winding of relay 3060, armature 3046, contact 25 and wiper 3092, armatures 3073, 3031, 3041, interrupter contact 3099, winding of magnet 3098 to battery. Relay 3060 operates over this circuit but not the magnet and at armature 3062 extends earth from armature 3024, upper and lower windings of relay 3050 in series to battery. Relay 3050 operates fully over this circuit to cause the finder switch F2 to hunt for an idle high grade junction. In addition relay 3060 at armatures 3063 and 3064 short circuits itself and releases, relay 3050 remaining held over armature 3053 to earth at armature 3022. If the wipers of the switch F2 are on contacts leading to a busy junction line, earth will be extended back over wiper 3096, armatures 3083, 3051, interrupter contacts 3101, winding of magnet 3100 to battery. This earth is also extended to one terminal of relay 3080, the other terminal being earthed over armatures 3055, 3035 and 3024. If an idle junction is found relay 3080 operates and switches through the conductors 3104 and 3105 at armatures 3081 and 3082 over the wipers of the switch F2 to the toll line control circuit associated with the junction line. The subsequent steps in the setting up of the connection now proceed as described above. If no high grade junction line is available the wipers of the switch F2 are rotated to contact 25, whereupon the relay group RG1 (Figs. 3 and 4) is taken into use. Relay 3080 now operates to switch through the conductors 3104 and 3105 and the connection is extended over conductors 295, 296 and 297, leading to this relay group. Relays 3000 and 3010 release on the operation of relay 3080 and open the circuit of relay 3020. Relay 3020 releases slowly and opens the locking circuits of relays 3040 and 3050 which release.

Earth is now extended over conductor 296, armatures 103, 162, winding of relay 110 to booster battery. The connection of booster battery to conductor 296 causes the equipment at the originating exchange to be modified for manual instead of automatic setting up of the connection, in a manner similar to that described in the previously mentioned Ostline patent. Relay 110 in operating at armature 111 closes an obvious circuit for the slow-to-release relay 120 which at armature 122 extends earth back over the private conductor 295, wiper 3096 and armature 3083 to the private conductor 3106. This operation occurs before the release of relay 3020. Relay 3080 is also held by this earth to battery over the winding of magnet 3100. In addition relay 120 at armature 122 and at armature 121 closes the following circuit for slow-to-release relay 130: earth at armature 272, armatures 223, 101, 121, winding of relay 130 to battery. Relay 130 at armature 133 provides an additional earth to the private conductor and at armature 132 short-circuits relay 120 which releases slowly. Relay 120 on releasing at armature 121 opens the circuit for relay 130 which releases slowly and during the release period of relay 130 the following circuit is closed: earth, armatures 272, 223, 101, 121 in its resting position, 131 in its operated position, winding of slow-to-release relay 160 to battery. Relay 160 in operating at armature 161 closes a circuit for the slow-to-release relay 150 and at armature 162 and its resting contact it opens the circuit for relay 110 whereupon booster battery is disconnected from conductor 296 and at armature 162 and its operated contact it connects the lower winding of relay 170 to the negative conductor 296. Finally at armature 163 relay 160 connects the lower winding of relay 180 to the positive conductor 297 over armature 104. Relays 150, 170 and 180 are thus operated and relays 170 and 180 at their armatures 172 and 183 provide alternative locking circuits for relay 160. Ring-back tone is now transmitted to the calling party over the following circuit: tone conductor 292, armature 274, condenser 291, armature 155, upper winding of relays 180 and 170 to earth, the tone being transmitted to the calling party by induction over the lower windings of these two relays.

The connection of relays 170 and 180 to conductors 296 and 297 serves as a signal to a register translator in the originating exchange that the transmission of information stored therein may commence. This information which is transmitted in code comprises the calling and called party's number and a digit which represents the rate at which the call is to be charged if the call is being set up by a subscriber or the digit 0 indicating that the call is being set up by an operator at a manual exchange. With regard to the code by which the information is transmitted as previously pointed out each digit is represented by a cycle of four pulses, which effect the operation of different combinations of storage relays which are connected up successively. In the circuit under consideration only one digit is stored and the storage group comprises the relays 230, 240, 250 and 260. The manner in which these relays are operated to indicate the various digits is shown in the table of Fig. 23, relay 230 being relay 1 of the group.

Consideration will first be given to the case of a call which is being set up by a subscriber and it will be assumed that the register-translator at the originating exchange has determined that the digit 1 represents the rate at which the call is to be charged. The seven digits which represent the called party's number are first transmitted and since each digit comprises four impulses, the wipers of the switch S are stepped to position 28 at the end of the last digit the normal position of the wipers of the switch S being the last contact associated with the odd numbered wipers. These digits are not stored in the relay group RG1. The next digit is the rate digit which is to be the digit 1 and this is stored on the group of storage relays 230, 240, 250 and 260. Thus on the first impulse of this digit which is a break impulse over conductor 297 and relay 180 releases. Relay 180 at armature 182 closes the following circuits: earth, armature 272, 223, 101, 121, 131, 151 where it divides one path extending over armature 182, winding of magnet 288 to battery to cause the magnet to energise preparatory to stepping its wipers to position 29 while the other path extends over armature 181, wiper 287, on contact 28, winding of relay 230 to battery. Relay 230 operates and locks over armature 232. At the end of the pulse relay 180 re-energises and the magnet 288 de-energises to step the wipers to position 29. When the next impulse is received relay 180 again de-energises and relay 240 is energised over wipers 287 on contact 29 and locks over armature 242. The next two impulses are transmitted over conductor 296 and cause the release of relay 170 which at armature 171 causes the energisation of magnet 288 only. The energisation of relays 230 and 240 is without effect in this case. At the end of this digit the wipers of the switch S are stepped to contact 32 where earth is extended over wiper 285, armatures 271, 221, winding of relay 100 to battery. Relay 100 operates and locks over armature 102 to the private conductor 295; at armature 101 it opens the above-traced impulse-repeating circuit and at armatures 103 and 104 it extends conductors 296 and 297 to the equipment shown in Figs. 5 and 6. The effect of this is to cause a calling number register (Figs. 7, 8, 9) to be associated with the equipment of Figs. 5 and 6, in order to receive the calling party's number transmitted thereto from the register translator at the originating exchange and to display it before the operator. The operation of the circuits shown in these figures will be described in detail later.

As a result of the operation of relay 100, the circuits for relays 170 and 180 are opened at the resting contacts of armatures 103 and 104. Relays 170 and 180 release followed by relays 160 and 150. Relay 150 at armature 152 opens the locking circuit of relays 230, 240, 250 and 260, the operated ones of which release to cause the release of relay 220 or 270 if either are operated. In addition relay 150 at armature 153 closes a self-interrupting circuit for magnet 288 over the winding of relay 140. Relay 140 operated in series with the magnet to maintain the relay group RG1 as busy and to maintain the circuit for the magnet at armature 141 until it is opened when wiper 281 reaches the home position. Relay 100 remains held until the connection to the operator is terminated when earth is removed from the private conductor and the equipment may be employed on another call.

Certain of the inter-zone calls, owing to the proximity of the originating and destination exchange, are regarded for charging purposes as local calls. The charging rate for such calls is represented by the digit 9 and they are not regarded as of sufficient importance to warrant the intervention of an operator if junction lines are unavailable. If the rate digit 9 is received, relay 250 operates and locks at armature 252 and closes a circuit at armature 251 for relay 270. Relay 270 at armatures 271 and 272 prevents the operation of relay 100; at armature 275 opens the connections over the private conductor to the equipment of Figs. 5 and 6, and at armature 274 returns busy tone from tone lead 293 to the calling party. The intervention of an operator is thus prevented.

If the call is being set up by an operator at a manual exchange the operator thereat will record the particulars of the call and instead of the calling party's number the digit 0 will be displayed before the operator. A call of this nature is indicated by transmitting the digit 0 in place of the rate digit. In this case therefore relay 260 is operated and locks over armature 262 and at armature 261 closes a circuit for relay 220. Relay 220 operates and locks over armature 222 to earth at armature 263, and at armature 221 opens one circuit and prepares another for relay 100. Further at armatures 224 and 225 it connects slow-to-release relays 200 and 210 to conductors 300 and 299 respectively. This causes the equipment of Figs. 5 and 6 to operate to seize an idle calling number register and when this operation is completed both relays 200 and 210 are operated. A circuit is now closed from earth on wiper 285 on contact 32, armatures 211, 201 and 192, lower winding of relay 290 to battery. Relay 290 is a self-interrupting relay and serves to step the wipers of the switch S at armature 191 and to control the transmission at armatures 193 and 194 of the digit 0 in code to the calling number register. For this it will be understood that a cycle of four impulses will be transmitted of which the fourth only will be effective in operating a storage relay in the appropriate relay group in the calling number register. For this purpose the impulse repeating contact 194 of relay 190 which controls the operation of the storage relays is short-circuited over wiper 283 for the duration of the first three impulses, i. e. while wiper 283 is passing over contacts 32, 33 and 34, an impulse being transmitted over conductor 300 with the wipers in position 35. When the digit 0 has been transmitted the wipers of the switch S are stepped to contact 36 whereupon relay 100 is operated over armature 221 in its operation position, contact 36 and wiper 285 to earth and the connection is extended to the equipment of Figs. 5 and 6 and the various relays and the switch S are restored as previously described.

A description will now be given of the equipment shown in Figs. 5 and 6 in conjunction with the equipment shown in Figs. 7, 8 and 9 which comprise the calling number register. When earth is extended over conductor 299 from the relay group RG1 of Figs. 3 and 4 relay 330 operates and at armature 331 extends earth back over the private conductor 298 and at armature 332 closes the following circuit: earth, armatures 376, 366, 332, winding of slow-to-release relay 320 to battery. Relay 320 operates and at armature 321 closes an obvious circuit for relay 350.

The wipers of the switch F1 have access to calling number registers shown in Figs. 7, 8 and 9 and if the contacts on which the wipers are standing lead to a busy register, earth will be extended back over wiper 433, armatures 371, 364, 352, interrupter contacts 432, winding of magnet 431 of the switch F1 to battery. This earth is also extended to one terminal of relay 360, the other terminal of which is earthed over armatures 372 and 353. Magnet 431 steps the wipers of the switch F1 until an idle register is found when relay 360 operates in series with the magnet which does not operate. Relay 360 at armature 365 completes a circuit for relay 340 over contacts associated with armature 394 to battery on conductor 300 and at armature 366 completes a circuit for relay 320 independent of relay 370. Finally relay 360 at armature 364 extends earth over armature 371, wiper 433, conductor 448, armature 725, winding of relay 710 to battery. Relay 710 which is slow-to-release operates and at armature 713 closes an obvious circuit for relay 660 (Fig. 8).

The equipment of Figs. 5, 6, 7, 8 and 9 is now in a condition to receive the calling party's number or the digit "0" in code as the case may be. Those impulses which are transmitted over conductor 300 will be repeated to the calling number register to cause the operation of the appropriate storage relay of the group allocated to the particular digit and will also cause the stepping of the distributor switch D1 while the impulses transmitted over conductor 299 will cause the stepping of the distributor switch only. As an example consider the case of a subscriber, the first digit of whose number is 5. Referring to the table shown in Fig. 23 it will be seen that second and fourth storage relays of the particular storage group are to be operated. The first impulse will thus be transmitted over conductor 299, whereupon relay 330 releases and at armature 331 closes the following circuit: earth, armatures 331, 361, 382, wiper 435, conductor 450, armatures 704, 682, winding of magnet 800 to battery. The wipers of the switch D1 are stepped to position 2 when relay 330 re-energizes. The second impulse will be transmitted over conductor 300 and thus relay 340 will release and complete the following circuit: earth, armatures 341, 363, wiper 434, conductor 449, armatures 706, 681, winding of relay 670 to battery. Relay 670 operates and at armature 672 extends earth over wiper 804 of the switch D1 on contact 2, winding of relay 510 to battery, relay 510 being the second relay of the 1st group of storage relays comprising relays 500, 510, 520, and 530. Relay 510 operates and locks over armature 512 to earth at armature 661. In addition relay 670 at 671 closes an obvious circuit for energising magnet 800 and the wipers of the switch D1 are advanced to position 3 when relay 670 releases at the end of the impulse. The next impulse will be transmitted over conductor 299 to cause the wipers of the switch D1 to be stepped to position 4 while the 4th impulse will be transmitted over conductor 300 to cause relay 530 to be operated over wiper 804 and to cause the wipers to be stepped to position 5 at the end of the impulse. The digit 5 is now stored on the 1st group of storage relays. The second digit of the calling party's number, say the digit 7, will be stored on the 2nd group comprising relays 540, 550, 560 and 570 by the operation of relay 540 only in a similar manner to that described for the first digit. The remaining digits are similarly stored on the relay groups shown.

When the last digit has been stored the wipers of the switch D1 will be stepped to position 21 when earth is extended over wiper 805 on contact 21, winding of slow-to-release relay 690, interrupter contacts 801, winding of magnet 800 to battery. The wipers of the switch D are thus automatically advanced to contact 1 where the above circuit is opened. Relay 690 operates in series with the magnet and at armature 691, earth is extended from armature 721 over armature 701 to battery over the lower winding of relay 700. Relay 700 is a two-step relay and operates its "X" armature 702 only at this time. In addition relay 690 at armature 692 closes a circuit for the lower winding of relay 680 which operates and locks over armature 683 to earth at armature 713, and at armatures 681 and 682 opens the impulse repeating circuits which extend from the equipment of Figs. 5 and 6 to relay 670 and the magnet 800 respectively. Further relay 690 at armature 692 also extends earth over armatures 724 and 705, conductor 451, wiper 436, armatures 362, 384, upper winding of relay 380 to battery. Relay 380 is a two-step relay and operates its "X" armature 385 only at this time. When the wipers of the switch D1 are stepped to contact 1, relay 690 releases and both windings of relay 700 then energizes in series, over armature 702 to earth at armature 714. Relay 700 thereupon operates fully. Similarly, relay 380 operates fully over both windings in series, armatures 385, 374 to earth at armature 354. Relay 380 at armature 383 closes a circuit for the lamps such as 453 which are provided at each operator's position and at armature 381 causes ring-back tone to be transmitted to the calling subscriber from tone lead 437 and condenser 438 and thence by induction over the windings of relays 330 and 340.

The circuits remain in this condition until one of the operators inserts the answering plug such as P1 (Fig. 19) of her cord circuit in the jack J1. When this occurs springs 442 are closed and earth is extended thereover, winding of relays 390 and 430 to battery. Relay 430 in operating locks over its lower winding, armatures 432 and 354 to earth and at armature 431 opens the circuit to the lamp 453. Relay 390 in operating at armature 392 extends earth over the upper winding of relay 400, the sleeve 441 of the jack J1, springs 1140 of the key K3 (Fig. 19), contacts of armature 1013 to battery, over resistance 1155 in parallel with the lamp 1154. The upper winding of relay 400 is of high resistance while the lower winding is of low resistance. The relay will operate over its upper winding in series with the supervisory lamp but the latter will not be lighted. Relay 400, in operating, at armature 405 provides an additional earth for relay 340. In addition relay 390 at armatures 394 and 395 reverses the connection of relays 330 and 340 to conductors 299 and 300 to give the necessary supervision; at armature 393 it provides an additional circuit for relay 320 while at armature 391 it extends earth over the upper winding of relay 370, armatures 384, 362, wiper 436, conductor 451, armature 705, lower and upper windings of relay 730 to battery. Relay 370 does not operate over this circuit. Relay 730 however operates fully and at armature 731 extends earth over armatures 741, 756, interrupter contacts 803, winding of magnet 802 to battery. The wipers of the switch F4 are thus stepped in search of the indicator panel associated with the operator who responded to the call. The stepping of the switch F4 is controlled over an alternating current test circuit which extends as follows: wiper 814 of the switch F4, conductor 815 (Figs. 9, 10, 17, 18 and 19), armature 1025 in the operator's cord circuit, secondary winding of transformer TR1, armature 1026, conductor 444 (Figs. 19, 18, 17, 10 and 6) springs 443, armature 382, wiper 435, conductor 450, armature 704, winding of relay 740 and the rectifier 742 in parallel, condenser 743, armature 754 back to wiper 814. When the required indicator panel is found relay 740 operates and opens the stepping circuit at armature 741 and its resting contact while at the same armature and its operated contact it closes an obvious circuit for relay 750. Relay 750 operates and locks over armature 752 to earth at armature 713. At armature 753 relay 750 short-circuits the lower winding of relay 730; at armature 754 it opens the test circuit; at armature 757 it provides an additional holding circuit for relay 710 and at armature 755 it closes the following circuit: earth, armatures 723, 755, 761, winding of slow-to-release relay 770 to battery. Relay 770 operates and at armature 776 closes a circuit for the slow-to-operate relay 760; at armature 775 it closes a circuit for energising magnet 800 preparatory to stepping the wipers of the switch D1 to position 2. Finally relay 770 at armatures 771—774 extends wipers 806 to 809 over wipers 810—813 and conductors 816—819 to wipers 970 to 973 of the distributor switch D2 associated with the indicator panel IP shown in Fig. 10.

The short circuiting of the lower winding of relay 730 enables relay 370 to operate over its upper winding. This relay locks over armature 373 and at armature 371 it opens the original guarding circuit for the register which is now guarded from earth at armature 757, armature 703 to conductor 448. At armature 372, relay 370 opens the circuit for relay 360 which releases and at armature 374 it opens the locking circuit for relay 380 which releases. Relay 380 in releasing terminates the transmission of ring-back tone at armature 381.

The indicator panel has been shown for simplicity with only one set of lamps and one set of storage relays. When the above-mentioned circuits to the indicator panel are completed, the armatures of group I of the storage relays in the register are connected to the windings of group I of the storage relays of the indicator panel. In the example previously given the first digit of the calling party's number was the digit "5" and hence relays 510 and 530 are operated. Earth is therefore extended over armatures 661, 512, contact 1 and wiper 807 of the switch D1, armature 772, wiper 811 of the switch F4, conductor 817, wiper 971 of the switch D2, upper winding of relay 910, winding of relay 940 to battery. Earth is also extended over armatures 661, 532, contact 1 and wiper 809, armature 774, wiper 813, conductor 819, wiper 973, upper winding of relay 930; winding of relay 940 to battery. Relays 910, 930 and 940 now operate, relays 910 and 930 locking over armatures 911 and 931 respectively to earth at armature 951. Relay 940 at armature 941 closes a circuit for the magnet 974. Relays 910 and 930 close a circuit for lighting the appropriate lamp on the panel, the circuit in this case extending from earth, armatures 902, 913, 924 and 935 to lamp No. 5, to give an indication to the operator of the first digit of the calling party's number.

Returning now to the calling number register, relay 760 in operating at armature 761 opens the circuit of relay 770 which releases slowly. On releasing relay 770 at armature 775 opens the circuit of magnet 800 which thereupon de-energises and steps the wipers of the switch D1 to position 2. In addition relay 770 at armature 771 to 774 opens the circuits extending to the indicator panel so that relay 940 de-energises relays 510 and 530 remaining held over their locking circuits. Relay 940 at armature 941 opens the circuit of magnet 974 which de-energises and steps the wipers of the switch D2 to position 2. Finally relay 770 at armature 776 opens the circuit of relay 760 which releases and at armature 761 again closes the circuit for relay 770. Relay 770 thereupon operates and at armatures 771 to 774 extends the armatures of the storage relays of groups II in the register to the windings of the storage relays of group II (not shown) of the indicator panel to cause the operation of the appropriate relays therein in a manner similar to that described above. The transfer of the remaining digits takes place in a similar manner and will not be further described.

When the fifth digit has been transferred from the calling number register, the wipers of the switch D1 will be stepped to position 6. Earth will then be extended over wiper 805 on contact 6, armatures 712, 794, 751, upper and lower windings of relay 720 to battery. Relay 720 operates and short-circuits its upper winding at armature 722; at armature 723 it opens the circuit of relay 770 and at armature 725 and its operated contact extends earth over conductor 448 to maintain the register busy and at its resting contact it opens the circuit of relay 710. Relay 710 at armature 713 opens the locking circuit of relays 680 and 750 which releases and at armature 714 opens the locking circuit of relay 700 which also releases. In addition relay 710 at armature 712 closes the following circuit: earth, wiper 805 of the switch D1 on contact 6, armature 712, contact 21 and bank multipling associated with wiper 805, winding of relay 690, interrupter contacts 801, winding of magnet 800 to battery. The wipers of the switch D1 are thus stepped to position 7 where a further self-interrupting circuit is closed for magnet 800 over armature 711. During this stepping of the switch relay 690 is operated and at armature 692 maintains relay 720 operated over its lower winding, the original circuit for this relay having been opened at armature 751 when relay 750 releases. Relay 690 releases when the switch D1 has been restored to normal and is followed by relay 720. The register is now completely restored and may be seized for another call.

If the digit "0" is received in the register from the circuit of Figs. 5 and 6, relay 530 only of group I of the storage relays will be operated. A circuit is then closed from earth at armature 531, armatures 521, 511, 501, 782, winding of relay 790 to battery. A circuit is now closed from earth on wiper 805 on contact 5, bank multipling, armature 792, contact 21 and bank multipling, winding of relay 690, interrupter contacts 801, winding of magnet 800 to battery. The switch wipers are thus stepped to position 6 where a further self-interrupting circuit is closed for magnet 800 over armatures 712 and 794. The wipers are stepped to position 7 where the previous self-interrupting circuit is again completed and the wipers are rotated to position 21 where a further previously-traced self-interrupting circuit is completed to return the switch wipers to normal. During this return movement relay 690 is operated and at armature 691, the following circuit is completed; earth at armature 721, armature 691, 795, upper winding of relay 780 to battery. Relay 780 is a two-step relay and operates its "X" armature 783 only at this time. When the switch D1 is returned to normal relay 690 releases and relay 780 operates fully over both windings in series, armature 783 to earth at armature 714. Relay 780 at armature 782 opens the circuit of relay 790 which releases.

The appropriate indicator panel is now taken into use over the wipers of the switch F2 as previously explained and the digit "0" is transferred to the first group of storage relays on the panel. The wipers of the switch D1 are then stepped to position 2 whereupon earth is extended over wiper 805 on contact 2, armatures 781, 794, 751, upper and lower windings of relay 720 to battery. Relay 720 operates to initiate the release of the register as previously described.

The position of the present time is therefore that an operator has associated her cord circuit with the connection and the calling party's number or the digit "0" is displayed on the indicator panel. Referring now to the cord circuit it should be noted that when the operator is on duty relays 1020, 1030 and 1040 are operated due to the operation of relay 1130 when the operator's set OS is plugged in. Relay 1130 causes the operation of these relays at armature 1132. Relays 1020, 1030 and 1040 in operating at their various armatures cause the circuits of the cord circuit to be connected up. When the operator is away from her position and her set is removed, relays 1020, 1030 and 1040 are released and a call coming to this position is, on the insertion of the plug P1 in the appropriate jack, routed to a neighbouring position over the armatures of these relays.

Assuming that the operator is at her position, she will now operate her listening key K1 to place her set in communication with the calling party. As a result of this operation earth at springs 1146 is extended over armatures 1035, 1101, winding of relay 1090, armature 1036, winding of relay 1010 to battery. Relays 1090 and 1010 operate and relay 1010 at armatures 1015 and 1016 extends the positive and negative conductors over armatures 1045, 1046, 1062 and 1081 to the terminals of the serially connected windings of the transformer TR3 and TR4 to close the speed circuit to the operator's set OS. At springs 1170 an obvious circuit is closed for relay 1070 which at armatures 1071 and 1072 opens points in the speech circuit extending over the calling plug P2 and at armature 1073 extends resistance battery over key K10, armatures 1042, 1013, springs 1140 to the sleeve conductor to maintain relay 400 operated.

The operator now inquires the number of the required party and notes the number of the calling party on the indicator panel. She then informs the calling party that she will set up the connection when a junction line is available and requests him to replace his receiver thus releasing the connection.

When the calling party replaces his receiver the equipment in the originating and central exchange is released and as regards the circuits shown the loop across conductors 3104 and 3105 (Fig. 2) and hence across 296, 297, 299 and 300 is opened. Relays 330 and 340 therefore release and relay 340 at armature 342 extends earth from armature 404 over armatures 423 to battery over the winding of slow-to-operate relay 410. Relay 410 operates and locks over armatures 411, 422, 421, 402 to earth and at armature 412 closes a circuit over the lower winding of relay 400 for the lamp 1154. Owing to the low resistance of the lower winding of relay 400, the lamp 1154 glows to indicate to the operator that the calling party has replaced his receiver whereupon she withdraws the plug P1 from the jack J1.

When the plug P1 is withdrawn from the jack J1, relays 390, 400 and 430 release followed by relays 410, 320 and 350. On the release of relay 350 earth is removed from conductor 298 whereupon relay 100 (Fig. 3) releases and also relay 3080 (Fig. 2) while relays 1010, 1070 and 1090 in the cord circuit release on the restoration of the key K1. The relay group RG1 is available for use on another call on the release of relay 100 while the switches F2 and F3 of the relay group RG are returned to normal whereupon this circuit is also available for use on another call.

Finally the operator closes key 978 (Fig. 10) to operate relay 950. Relay 950 locks over armature 956, springs 979, interrupter contacts 975, winding of magnet 974 to battery. The magnet energises in this circuit and the wipers of the switch D2 are stepped to position 6 in which position springs 979 are opened. In addition relay 950 at armatures 951 to 955 opens the locking circuits of the storage relays which release and the indicator panel is now available for use on another call, relay 950 releasing slowly when its locking circuit is opened by springs 979. It is pointed out that contacts 6—10, 11—15, 16—20 and 21—25 are multipled to contacts 1—5 so that the switch D1 does not have to be restored to normal after one operation, springs 979 opening in positions 1, 6, 11, 16 and 21.

Arrangements are also provided whereby the calling subscriber may recall the operator by flashing his switchhook. When this occurs relay 340 (Fig. 5) will be released intermittently and relay 410 will operate on the first release to cause lamp 1154 to glow as pointed out above. When relay 340 re-energises relay 420 operates and locks over armature 421 and at armature 422 opens the locking circuit of relay 410 which releases and opens the circuit to the lamp 1154. Finally relay 420 at armature 423 connects interrupted earth over conductor 446 to relay 410 to cause the latter to operate intermittently and flash the lamp 1154 to attract the operator's attention.

When the operator decides to set up the required connection she inserts the plug P2 of her cord circuit in the jack J2 shown in Fig. 17. The equipment shown in Figs. 17 and 18 comprises the relay group RGT together with the two hunting switches RGTF and RTF, the latter having access to register-translators which control the setting up of the connection.

Arrangements may however be provided whereby a signal is given at the operators' cord circuits when all the toll lines are in use whereby the number of unsuccessful attempts at completing the connection are reduced.

On the insertion of the plug in the jack J2 earth is extended from springs 1389, armature 1223, winding of slow-to-release relay 1200 to battery. Relay 1200 operates over this circuit and at armature 1202 connects the magnet 1371 of the switch RGTF to wiper 1378. If the contact on which the wipers of the switch RGTF are standing lead to a busy relay group, earth will be extended over wiper 1378, armatures 1213, 1202, interrupter contacts 1372, winding of magnet 1371 to battery. The wipers of the switch RGTF are thus rotated until an idle relay group is found when relay 1210 operates in series with the magnet 1371, the relay 1210 having previously been short-circuited. Relay 1210 in operating at armature 1213 opens the circuit for the magnet 1371 and closes an obvious circuit for operating relay 1230.

Relay 1230 in operating at armature 1232 connects the magnet 1373 of the switch RTF to wiper 1380. If the contacts on which the wipers of the switch RTF are resting lead to a busy register-translator earth will be extended over conductor 1396 and wiper 1380, armatures 1312, 1305, 1232, 1311, interrupter contacts 1374, winding of magnet 1373 to battery. In addition earth at armature 1233 will be extended to one terminal of relay 1300, while the earth fed back over wiper 1380 will be extended to the other terminal. The switch RTF now steps until an idle register-translator is reached when relay 1300 will operate from earth at armature 1233, winding of relay 1300, armature 1311, interrupter contact 1374, winding of magnet 1373, to battery. Relay 1300, only operates over this circuit and at armatures 1303 and 1304 connects relays 2070 and 2080 of the register-translator to the outgoing conductors 1403 and 1404 of the relay group RGT which leads to the group selector RTGS shown in Fig. 1. The circuit for these relays extends over armatures 2104 and 2105 of the impulsing relay 2100 in the register-translator. On the operation of relays 2070 and 2080 an obvious circuit is closed for slow-to-release relay 2060 which at armature 2062 closes an obvious circuit for slow-to-release relay 2050. In addition relay 2060 at armature 2061 extends earth from armature 2043 to relay 1650 which also operates. Relay 2050 in operating at armature 2052 extends earth over armature 1977, winding of relay slow-to-release 2000 to battery. Relay 2000 in operating at armature 2001 closes an obvious circuit for slow-to-release relay 2010. Further at armature 2003, relay 2000 extends earth over armatures 1991, 1984, interrupter contacts 2198, winding of magnet 2197 to battery. The wipers of the switch KSF are thus stepped in search of the key set KS belonging to the position at which the operator has inserted the plug P2 in the jack J2. The test circuit for the switch KSF extends from wiper 2232, conductor 1167 (Figs. 14, 15, 16, 19 and 20) key K7 in the operator's cord circuit, armature 1025, secondary winding of transformer TR1, armature 1026, conductor 1394 (Figs. 20, 19, 18 and 17), armatures 1211, 1222, wiper 1376, armature 1242, wiper 1383, conductor 1400 (Figs. 18 and 15), armature 2002, winding of relay 1990 in parallel with the rectifiers 2250 and 2251, condenser 2252, armature 1978, back to wiper 2232. When the key set is found relay 1990 operates and at armature 1991 closes a circuit from earth at armature 2003 for relay 1980 which locks over armature 1981 and at armature 1984 opens the circuit of the magnet 2197. In addition at armature 1982 relay 1980 closes a circuit for relay 1970; at armature 1983 connects wiper 2233 to the winding of relay 2040 and at armature 1985 extends earth over armature 2004, conductor 1399 (Figs. 15 and 18), wiper 1382, armature 1302, upper winding of relay 1240 to battery. Relay 1240 is a two-step relay and operates its "X" armature 1243 only at this time.

Relay 1970 in operating at armature 1978 opens the above-traced test circuit and at armature 1977 opens the circuit of relay 2000 which thereupon releases slowly followed by relay 2010. In adition relay 1970 at armature 1971—1976 connects up wipers 2226—2231 to the register-translator. As a result of this earth is extended from armature 1664 over armature 1976, wiper 2227, conductor 1162 (Figs. 14, 15, 16, 19 and 20), winding of relay 1120 to battery in the operator's cord circuit. Relay 1120 at armature 1121 causes the lamp 1153 to be lighted and at armatures 1122 and 1123 causes dial tone from the tone conductor 1152 to be transmitted to the operator's head set over the transformer TR4. A visual and audible signal is this given that the register translator is in a condition to receive the digits for setting up the connection.

Relay 2000 in releasing at armature 2004 removes earth from conductor 1399 leading to the relay group RGT. As a result of this relay 1240 energises fully over both its windings in series, armature 1243 to earth at armature 1235. Relay 1240 in operating fully at armatures 1241 and 1242 completes points in the speaking connection and at armature 1244 extends resistance earth over armature 1323, bank contact and wiper 1377, armature 1224, sleeve of the jack J2, sleeve conductor of the plug P2, springs 1145, contact associated with armature 1014, lamp 1156 in parallel with resistance 1157 to battery. Lamp 1156 is not, however, lighted owing to the resistance in the circuit.

The operator may now set up the desired number on her key set KS and where in the case assumed, the call is to be set up to a subscriber at an exchange in another zone, the operator will in general have to set up a number consisting of eight digits of which the first is the digit "0" the next two represent the designation of the wanted zone, the next two represent the exchange within that zone while the remaining three represent the called party's number in his own exchange. It should be noted that the connections to the keys forming the key set KS are so arranged that the digits are transmitted to the register translator in code, the arrangement being such that different combinations of the leads 1163—1166 are earthed to represent the digits. Thus in the case where the first digit is "0" the depression of the corresponding key in the key set KS will cause earth to be extended over contacts 1168 to conductor 1166 (Figs. 20, 19, 16, 15 and 14) bank contact and wiper 2231, armature 1972, wiper 2209 on contact 1, winding of relay 1500 to battery. The code employed is the same as that previously discussed.

Relay 1500 in operating locks over armature 1502 to earth at armature 1651 and at armature 1501 extends earth from armature 1651 over armatures 1511, 1521, 1531, winding of relay 1620 to battery. Relay 1620 operates and at armature 1625 extends earth over cam springs 2205, interrupter contacts 2200, winding of magnet 2199 to battery. The wipers of the route control switch RCS are thus rotated to contact 13 where the above circuit is opened by the opening of cam springs 2205.

Further, when one of the keys of the key set KS is depressed earth is also extended over contacts such as 1169 to conductor 1161 and thence over wiper 2226 (Fig. 14) armature 1971, winding of magnet 2190 to battery. Magnet 2190 therefore energises preparatory to stepping the wipers of the switch D3 on to contact 2. When the operator releases the key this earth is removed, and the magnet de-energises to step the wipers on to contact 2. In this position earth is extended over wiper 2210 on contact 2, armature 1623, contact 1 and wiper 2214 of the switch D4, interrupter contacts 2193, winding of magnet 2192 to battery. The wipers of the switch D4 are thus stepped to position 2 whereupon the above circuit is opened. The reason for the stepping of the switch D4 is that this switch controls the transmission of impulses from the register-translator corresponding to the number set up by the operator, but since the digit "0" is not employed in the setting up of the connection, but is only for the purpose of causing certain circuit changes in the register-translator, the switch D4 is stepped on to contact 2 to avoid transmission of this digit.

The second digit is now set up by the operator and is stored on group II of the storage groups and comprising relays 1540, 1550, 1560 and 1570. The energising circuits for this group of relays have not been shown but will be understood from the above explanation of the energisation of group I. The remaining digits are stored on similar groups, the switch D3 being stepped from the position to position as each digit is stored. With wiper 2210 on contact 3, i. e. after the storing of the 2nd digit, earth is extended over this wiper to operate relay 1630. Relay 1630 locks up over armature 1631 to earth at armature 1657 and at armature 1632 closes the following circuit for the lower winding of relay 1640: earth, armatures 1632 and 1641, lower winding of relay 1640 to battery. Relay 1640 is a self-interrupting relay and serves to generate impulses for stepping the various switches in the register-translator and also for controlling the transmission of impulse series therefrom.

On the first energisation of relay 1640 earth is extended over armatures 1642, 1673, 2101, 2162, 2114, 2071, 2081, 2093, upper winding of relay 2090 to battery.

Relay 2090 is a two-step relay and operates its X armature 2091 only at this stage. When relay 1640 releases relay 2090 operates fully over its upper and lower winding in series, armatures 2091, 2113 to earth at 1658. At armature 2092 relay 2090 prepares a circuit whereby relay 2100 is energised on the next operation of relay 1640, and at armature 2094 closes a circuit for both windings of relay 2120 in series. This latter relay energises and at armature 2123 short-circuits its lower winding and at armature 2121 extends earth from armature 1871 to battery over the winding of relay 2130. Relay 2130 which is slow-to-release energises and closes a circuit for slow-to-release relay 2140. When relay 2100 operates on the next operation of relay 1640 earth is extended over armatures 2101, 1732, winding of the vertical magnet 2194 of the two-directional switch TD1 to battery. The wipers of the switch TD1 are thus raised vertically in synchronism with the operation of the relay 2100. In addition relay 2100 at armature 2102 extends earth over armatures 1794, 1785, 1775, 1765, 1754, lower winding of relay 1750 to battery. Relay 1750 which is the first of a series of counting relays comprising relays 1750, 1760, 1770, 1780, 1790 and 1800 is a two-step relay and at this time closes its X armatures 1753 only. Finally relay 2100 at armatures 2104 and 2105 opens the circuit extending from relays 2070 and 2080 to the group selector RTGS (Fig. 1) but the opening of these circuits is ineffective at the present time since armature 2104 and 2105 are short-circuited by armatures 1746 and 1747.

The positioning of the two-directional switch TD1 is controlled in accordance with the second and third digits transmitted by the operator, which digits have been stored on storing relay groups II and III over wipers 2206, 2207, 2208 and 2209 of the switch D3. Contacts 1—8 associated with these wipers are multipled to the corresponding contacts of wipers 2215, 2216, 2217 and 2218 of the switch D4. With the wipers of this switch on position 2, a connection extends from the contacts associated with armatures 1541, 1551, 1561, 1571 of the second group of storing relays to the second contacts associated with wipers 2215, 2216, 2217 and 2218 of the switch D4. Assume by way of example that the second digit dialled by the operator is the digit 8. In this case relay 1560 of the second group of storing relays will have been energised and earth will be extended over armature 1652, armature 1561, contact 2 associated with wipers 2216, winding of relay 1700 to battery. Relay 1690, 1700, 1710, and 1720 act as decoding relays and in accordance with the digit which is stored on the particular group of storing relays, earth is extended to the appropriate one of the 10 conductors over the contacts of these relays. These conductors extend over the cable indicated to armatures associated with the counting relay chain comprising relays 1750, 1760, 1770, 1780, 1790 and 1800. As pointed out above the counting relays count the number of impulses transmitted to the vertical or rotary magnet of the switch TD1 and when this number coincides with the number stored on the appropriate group of storing relays impulse transmission to the magnet is terminated. This operation is similar to that described in the register-translator shown in Ostline's previously mentioned patent and will not be described in detail. When the correct number of impulses have been transmitted, in this case 8, earth is extended over armatures 1761, 1801, 1803, 1887, winding of relay 2110 to battery.

Relay 2110 operates to disconnect relay 2100 from armature 1642 of relay 1640 at armature 2114 and at armature 2111 extends earth over armatures 1733, upper winding of relay 1730 to battery. Relay 1730 is a two-step relay and operates its X armature 1731 only at this time. Relay 2110 at armature 2112 opens the locking circuit of the relays of the counting chain which thereupon release and open the original energising circuit of relay 2110, this relay, however, being maintained operated over armature 2115 to earth at armature 2122, 2131 or 2141. In addition at armature 2112, relay 2110 extends earth from armature 2051 over armature 1745, lower winding of relay 1670, winding of magnet 2192 of the switch D4 to battery. Relay 1670 and the magnet 2192 energises over this circuit and relay 1670 at armature 1673 opens a further point in the impulsing circuit. Relay 2110 also at armature 2113 opens the locking circuit of relay 2090 which releases, and at armature 2094 opens the circuit of relay 2120 which releases slowly followed by relays 2130 and 2140. Relay 2110 is released when relay 2140 finally releases whereupon relay 1730 energises fully and locks over both windings in series, armature 1731 to earth at 1656. In addition at armature 2112 the circuit for relay 1670 and of the magnet 2192 is opened whereupon the wipers of the switch D4 are stepped to position 3. Relay 1670 also releases and at armature 1673 closes a point in the impulsing circuit which is completed by the closing of armature 2114. Relay 2090 is again operated on the first impulse and relay 2100 is operated on the second impulse and at armature 2101 extends earth over armatures 1732, 1742, winding of rotary magnet 2195 of the switch TD1 to battery. The number of steps taken by the rotary magnet is determined in a similar manner to that described for the vertical magnet and relay 2110 again operates to terminate the impulsing of the rotary magnet and to cause the wipers of the switch D4 to be stepped to position 4. In addition at armature 2111 earth is extended over armatures 1733, 1743, upper winding of relay 1740 to battery. Relay 1740 is a two-step relay and closes its X armature 1744 only at this time. When relay 2110 releases relay 1740 operates fully over both windings in series, armature 1744 to earth at armature 1734. In addition at armature 1742 relay 1740 opens the circuit to the rotary magnet 2195 and at armature 1741 earth is extended over armature 1622, armature 1903 to conductor 2071. The conductors 2065—2071 are connected to the various wipers of the route control switch RCS, which has the same purpose as the route control switch described in Ostline's previously mentioned patent.

Briefly the switch RCS as it steps from contact to contact controls the transmission of the necessary impulses from the register-translator in accordance with cross-connection between its contacts and the conductors shown adjacent to the banks. The operation of this switch forms no part of the present invention but in order that the setting up of the connections by the register-translator may be more easily understood a detailed example of a set of cross-connections has been given in Fig. 22 on the assumption that conductor 2071 is connected to wiper 2234 of the route control switch for the purpose of setting up a connection to another zone. Referring to Fig. 1 it will be seen that as regards the equipment in the Mons exchange, the impulses transmitted by the register-traslator will have to effect the setting of the group selector RTGS while a further digit is required for selecting the required grade of toll line in the relay group RG as previously described. Finally the called party's number and an additional digit, the digit 0, are transmitted to the toll line control circuit TLCC in code, the additional digit serving to prevent the timing device in this circuit from becoming effective and also to prevent the printing equiment from being connected up as previously described. Two digits are thus necessary for setting the equipment in the Mons exchange. Referring now to Fig. 22 which shows the cross-connections in the call under consideration, it will be noted that the first digit is controlled by the connection of contact 13 to the conductor 2076. This conductor is connected to wiper 2221 and the contact on which this wiper stands is arbitrarily connected to one of the 10 impulse control conductors. The first digit transmitted is thus dependent upon the zone of the called party in order to set the group selector RTGS in such a manner that the junction line to be seized will be one extending to the required zone. For instance, suppose the group selector RTGS is to be set to level 5 then the contact on which wiper 2221 is resting will be connected to impulse conductor 5 which is extended to armature 1791 of the counting relays previously described.

Impulse transmission from the register-translator is initiated on the release of relay 2110 and is effected by relay 2100 operating in synchronism with relay 1640. It is to be noted that since relay 1740 is now operated armatures 1746 and 1747 are now opened and hence the opening of armatures 2104 and 2105 on the energisation of relay 2100 cause break impulses to be transmitted over conductors 1401 and 1402 and thence over the relay group RG over the selector RTGS. The counting relays 1750, 1760, 1770, 1780, 1790 and 1800 operate as previously described and at the end of the 5th impulse earth on armature 1791 is extended over armatures 1884, 1803, 1887, winding of relay 2110 to battery. Relay 2110 operates to terminate the impulse transmission and at armature 2111 earth is extended over armatures 1733, 1743, 2182, winding of magnet 2199 to battery. The magnet 2199 is thus energised preparatorily to stepping the wipers of the switch RCS to position 14 when relay 2110 releases and this operation will take place each time relay 2110 is energised. With wiper 2234 on contact 14 earth is extended to conductor 2 of the impulse control conductors to cause the transmission of the digit 2. The reason why this digit is fixed in the present case is that as pointed out above only calls for which the rate is higher than the lowest value are routed to an operator and all these calls will require high grade junction lines. It is of course possible that this digit will have to be made variable in which case an additional wiper will have to be provided on the switch TD1 and contact 14 would be cross-connected to this wiper. When the digit 2 has been transmitted wiper 2234 is stepped to contact 15.

The toll line control circuit TLCC is now seized and is prepared for receiving the called party's number and the digit 0. This transmission takes place in code and in order to alter the circuits of the register translator so that this coded transmission may take place contact 15 associated with wiper 2234 is cross-connected to conductor 2072 so that earth extended over this conductor operates relay 1870 over its upper winding. Relay 1870 at armature 1871 closes an obvious circuit for slow-to-operate relay 1880 which at armature 1883 closes the following circuit: earth, armature 1735, lower winding of relay 1870, armature 1883, winding of relay 1890 to battery. The operation of relays 1880 and 1890 connects the 10 impulse control conductors to the windings of relay 1820, 1830, 1840, 1850 and 1860 in the manner shown.

With regard to the code employed as described above each digit comprises a cycle of four impulses and each impulse is transmitted either over conductor 1401 or conductor 1402. The counting of each cycle is effected by relay 1750, 1760, 1770 and 1780 and the determination as to over which conductor an impulse is to be transmitted is effected by earth extended over the appropriate one of the ten control conductors.

The second and third digits forming the called party's number have been stored by the vertical and rotary movement of the switch TD1 and the transmission of these two digits is effected by cross-connections from contacts 16 and 17 associated with wiper 2234 to conductors 2073 and 2074 respectively which are in turn connected to the vertical wiper 2225 and wiper 2223, the contacts associated with wiper 2223 being multipled vertically. Thus with wiper 2234 on contact 15 earth is extended over conductor 2073 vertical wiper 2225, and, assuming the second digit is the digit 8, over contact 8 in the vertical bank, impulse control conductor 8, armature 1898, lower winding of 1840 to battery. Relay 1840 operates and at armature 1841 closes a circuit for relay 1810. The following circuit is now closed: earth at armature 1776, armature 1766, 1755, 1842, 1811, winding of relay 2150 to battery. From a consideration of the table shown in Fig. 23 it will be seen that the digit 8 will be represented by a cycle of impulses of which the first, third and fourth will be transmitted over the negative conductor 1402, while the second will be transmitted over the positive conductor 1401. On the next operation of relay 1640, relay 2090 operates over its first step and operates fully on the release of relay 1640 as described previously and at armatures 2095 and 2096 connects resistance battery and earth to the positive and negative conductors 1401 and 1402 respectively, in order to improve the impulsing circuit. On the next operation of relay 1640, relay 2100 operates and opens its armatures 2104 and 2105. As a result of the opening of the armatures 2104 and 2105 a break impulse is transmitted over the negative conductor 1402 while no impulse is transmitted over the positive conductor 1401 since armature 2104 is short circuited by the operated armature 2151 of relay 2150.

Relay 1750 operates fully at the end of the first impulse and locks up over armature 1753 while at armature 1755 it opens the above-traced circuit for relay 2150 which thereupon releases. The next impulse is, therefore, transmitted from the register-translator as a break impulse over the positive conductor 1401, since armature 2151 is now opened and armature 2152 is closed to complete a short-circuit across armature 2105 over armature 1885. Relay 1760 operates fully at the end of the second impulse whereupon the following circuit is closed for relay 2150: earth, armature 1776, 1766, 1844, winding of relay 2150 to battery. The next impulse is again transmitted as a break impulse over the negative conductor 1402. Relay 1770 operates at the end of the third impulse and the following circuit is now closed for relay 2150; earth, armature 1776, 1845, 1811, winding of relay 2150 to battery. The fourth impulse is thus transmitted as a break impulse over the negative conductor 1402. Relay 1780 operates fully at the end of the fourth impulse and the following circuit is then closed: earth, armatures 1872, 1786, winding of relay 2110 to battery. Relay 2110 operates to terminate the impulse transmission and at armature 2112 opens the circuit of relay 1780 which thereupon releases. Consequently when impulse transmission again commences for the transmission of the third digit relays 1750, 1760, 1770 and 1780 are again operated successively to count the four impulses of the next impulse cycle.

When relay 2110 releases at the end of the transmission of the second digit of the called party's number the circuit of magnet 2199 is opened at armature 2111 and the wipers of the route control switch RCS are stepped to position 17. With wiper 2234 on contact 17 earth is extended to conductor 2074 and thence wiper 2223 of the switch TD1 in order to control the transmission of the third digit of the called party's number. This takes place in a manner similar to that described above for the second digit and therefore a detailed description thereof will not be given.

The fourth to the eighth digits of the called party's number are stored on the relay groups IV to VIII and the circuits of the register-translator have to be altered slightly in order that the transmission of these digits may be controlled in accordance with the operation of the storage relays. For this purpose, contact 18 associated with wipers 2234 is cross-connected to conductor 2078 so that when wiper 2234 steps to contact 18 at the end of the transmission of the third digit, earth is extended over this wiper, conductor 2078, armature 2175, winding of relay 2160 to battery. Relay 2160 operates and at armature 2164 closes a circuit for the slow-to-operate relay 2170. In addition, relay 2160 at armature 2162 opens the impulsing circuit to relays 2090 and 2100 to delay impulse transmission from the register-translator until the circuit changes have been completed, and at armature 2163 a circuit is completed prior to the operation of relay 2170 from earth at armature 2173, armature 2163, winding of relay 2110 to battery. Relay 2110 operates and at armature 2111, again closes the circuit for magnet 2199. In addition, at armature 2161, relay 2160 prepares a circuit which is completed on the operation of relay 2110 and which extends as follows: earth, armatures 2051, 2112, 2161, 2172, lower winding of relay 1670, winding of magnet 2192 to battery. The magnet 2192 energizes preparatory to stepping the wipers of the switch D4 and deenergizes on the operation of relay 2170. The wipers of the switch D4 are thus stepped on to contact 4 in which position the appropriate ones of relay 1690, 1700, 1710, 1720 are operated over wipers 2215, 2216, 2217 and 2218 in accordance with the operation of the relays in storage groups IV. Further, when relay 2170 operates, the circuit of relay 2110 is opened and this relay releases, whereupon at armature 2111 the circuit of magnet 2199 is opened so that this magnet de-energizes and steps the wipers of the switch RCS on to contact 19. The following circuit is now closed for the left-hand winding of relay 2260: earth, armatures 2051, 2112, 2171, 2261, left-hand winding of relay 2260 to battery. Relay 2260, at armature 2262, locks to earth at armature 1735 and at armature 2264 extends earth over the contact pyramid controlled by relays 1690, 1700, 1710, 1720, so that the appropriate impulse control conductor is earthed to cause the operation of the appropriate ones of relays 1810, 1920, 1830, 1840, 1850 and 1860 which control the transmission of the coded digits as previously described.

The transmission of the coded digits representing the fourth to the eighth digits of the called party's number takes place in a substantially similar manner to that described above for the first two digits and will not, therefore, be described in detail. It should be noted that when relay 2110 operates at the end of each digit the circuit for operating magnet 2192 now extends from earth at armature 2151, armatures 2112, 2263 and thence over the lower winding of relay 1670 to the magnet 2192. The wipers of the route control switch RCS make one step for each digit transmitted but there are no cross-connections from contacts 19 to 23 since the route control switch does not take part in the determination of these digits. The wipers of this switch would therefore remain in one position during the transmission of the fourth to eighth digit, but in order to avoid altering the circuit to effect this it has been considered simpler to allow the wipers to be stepped and to leave five blank contacts associated with wiper 2234.

When the eighth digit has been transmitted, wiper 2234 is stepped on to contact 24 which is cross-connected to conductor 0 of the impulse control conductors in order to effect the transmission of the digit 0. This digit, as previously described, is transmitted to the toll line control circuit and serves to prevent the timing of the call and the connecting up of the printing equipment. After the transmission of the digit 0 wiper 2234 of the route control switch RCS is stepped to contact 25 which is cross-connected to conductor 2079. Earth is therefore extended over conductor 2079, winding of relay 2180 to battery. Relay 2180 operates to cause the release of the register-translator.

Relay 2180 at armature 2181 opens the impulsing circuit to relays 2090 and 2100, at armature 2182 it opens the circuit of magnet 2199 of the route control switch, and at armature 2183 it closes a circuit from resistance earth at armature 1624, armature 2183, conductor 1398 (Figs. 15 and 18) bank contact and wiper 1381 armature 1306, lower windings of relays 1310 and 1320. Relay 1310 operates and locks over its upper winding and armature 1313 to earth at armature 1231 while relay 1320 is marginal and does not operate over the above circuit. The operation of relay 1320 as will be pointed out later causes the supervisory lamp in the cord circuit to be lighted when the connection has been set up to the called party but before he replies. Now when the operator is setting up a connection to a local subscriber it is assumed that this condition obtains when transmission from the register-translator is completed. In this case relay 1620 in the register-translator is not energised and hence direct earth at armature 1624 is extended to the windings of relays 1310 and 1320. Relay 1320 as well as relay 1310 now operates. However when the operator is setting up an inter-zone call, the conection may not be completed until some time after the completion of transmission from the register-translator, particularly if the connection extends through one or more tandem exchanges. For this reason relay 1320 is not operated when the register-translator releases but arrangements are provided whereby when the connection is completed, a booster battery pulse is transmitted over the private conductor, winding of relay 1330 and rectifier to earth. Relay 1330 now operates and at armature 1332 closes a circuit for the upper winding of relay 1320 which thereupon operates. Relay 1320 in operating at armature 1323 extends direct earth from armature 1235 to the supervisory lamp in the cord circuit in place of the resistance earth from armature 1244 whereupon the supervisory lamp is lighted. Relay 1310 in operating at armature 1311 opens the circuit for relay 1300 which releases and at armatures 1303 and 1304 extend the jack conductors 1387 and 1388 directly to the first group selector RTGS. Also at the same armatures relay 1300 disconnects relays 2070 and 2080 of the register-translator from conductors 1403 and 1404 leading to the first group selector RTGS. These relays thereupon release and open the circuit of relay 2060. Relay 2060 in releasing at armature 2061 opens the circuit for relay 1650 which at armature 1657 opens the circuit relay 1630 which releases and at armature 1632 prevents further operation of the impulse generating relay 1640. In addition, relay 1650, at armature 1656, opens the locking circuit for relay 1730 which thereupon releases and opens the locking circuit for relay 1740 which also releases. Finally, relay 1650 opens the locking circuits for the relays of the storing groups to allow these relays to release.

In addition, relay 2060 in releasing at armature 2062 extends earth over the lower winding of relay 1660, off-normal springs 2201 in their operated position, interrupter contacts 2191, winding of magnet 2190 to battery. The magnet 2190 is energised over this self-interrupting circuit and rotates the wipers of the switch D3 to contact 11 where the self-interrupting circuit is opened at the off-normal springs 2201. The earth connection from armature 2062 is then extended over off-normal contacts 2201 in their rest position, off-normal contacts 2202, interrupter contacts 2193, winding of magnet 2192 to battery. The wipers of the switch D4 are thus rotated in a similar manner to position 11 whereupon the off-normal springs 2202 are restored to their normal position and the earth connection is further extended over vertical off-normal springs 2203, winding of the release magnet 2196 of the switch TD1 to battery. The switch TD1 is thus restored to normal and with the vertical off-normal springs 2203 in their resting position earth is then extended over off-normal springs 2204 of the route control switch RCS, interrupter contacts 2200, winding of magnet 2219 to battery. The wipers of the route control switch are thus rotated to contact 1 where the self-interrupting circuit is opened due to the opening of off-normal springs 2204. It is to be noted that relay 1060 remains operated during the restoration to normal of the various switches in the register-translator. This relay, at armature 1662 short-circuits its upper winding to make it slow-to-release and at armature 1663 it provides its own operating earth independently of relay 2060. Finally, at armature 1663 it extends earth over conductor 1396 in order to busy the register-translator during the restoration to normal of the various switches.

Finally, relay 2060, at armature 2062 and its working contact opens the circuit for relay 2050 which upon releasing at its various armatures opens the holding circuits for the various operated relays in the register-translator which relays thereupon release. The register-translator is now completely restored to normal and can be used for setting up a further connection.

When the register-translator has been released, the connection extends from the operator's position, the switch RGTF, the relay group RGT, the group selector RTGS, the relay group RG, the switch F2, the toll line control circuit TLCC and thence over the junction or toll line to the required exchange and to the required subscriber in that exchange. A connection is also set up to the calling party over apparatus which is not shown by the insertion of the plug P1 in an appropriate jack. On the reply of the called party, the battery and earth connections are reversed over the speaking leads so that relay 1280 (Fig. 18) operates and at armature 1282 removes a short-circuit from around the lower winding of relay 1250. This increases the resistance in the circuit of the supervisory lamp 1156 and the lamp is extinguished. Relay 1250 however operates over this circuit. The operator may now converse with either the calling or called party by operating the keys K1 or K2 respectively while she may ring the parties by operating the keys K3 or K4.

When the conversation is terminated by the parties replacing their receivers, the lamp 1154 in the operator's cord circuit is lighted in the manner previously described. The operator thereupon removes the plug P1 from the jack. With regard to the called party, relay 1280 releases when he replaces his receiver whereupon earth from armature 1235 is extended over armatures 1282, 1253, 1273, winding of relay 1260 to battery. Relay 1260 at armature 1261 closes a circuit over the upper low-resistance winding of relay 1250 for the supervisory lamp 1156. This lamp is lighted over this circuit. In addition relay 1260 locks over armatures 1262, 1271, 1251 to earth. Relay 1270 is provided for the purpose of enabling the called party to recall the operator by flashing her switchhook. Since relay 1270 operates in a similar manner to relay 420 no further description of this feature will be given. The operator now removes the plug P2 from the jack J2 to open the multiple circuit of relays 1220 and 1230 at springs 1389. Relay 1220 in releasing at armature 1223 prepares a point in the original circuit for relay 1200 and at armatures 1221 and 1222 opens the conversational circuit. Relay 1230 at its various armatures opens the locking circuits of the relays in the relay group RGT so that this apparatus can now be employed on another call.

While it is not proposed to deal in detail with the other types of calls which may be set up by the register-translator, the general principles by which the selection of the wipers of the route control switch RCS are selected will be explained. Certain calls are set up by dialling four digits of which the first and fourth are the digit "0." In this case relay 1620 will be operated as before and in addition relay 1580 of the storage relays of group IV will also be operated. Earth is thereupon extended from armature 1621 of relay 1620, armatures 1611, 1601, 1591 and 1581 to wiper 2219 of the switch TD1. Calls of this type fall into two different classes which require different wipers of the route control switch for effecting their setting up, and the connecting up of these wipers is controlled by relays 1950 and 1960. These relays are connected to the appropriate contacts in the bank associated with wiper 2219 of the switch TD1 so that one or other is operated in accordance with the second and third digits set up by the operator. The operation of one or other of relays 1950 and 1960 causes the appropriate wiper of the route control switch to be selected over conductor 2065 or 2066.

In a number of cases the selection of the appropriate wiper of the route control switch RCS for calls the first digit of which is "0" is effected by the operation of one of relays 1910, 1920, 1930 or 1940 in accordance with the second digit set up by the operator. The energising circuits of these relays are completed over the appropriate vertical contacts associated with wiper 2224 so that when the switch TD1 has been set vertically on a call of this type, earth is extended over armature 1626, vertical wiper 2224 and bank contact winding of one of the relays 1910, 1920, 1930 and 1940 to battery. The appropriate wiper of the route control switch RCS is then taken unto use over conductor 2067, 2068, 2069 or 2070.

It is to be noted that the operation of any one of the relays 1910, 1920, 1930, 1940, 1950 and 1960 closes a circuit for relay 1900 which in operating at armature 1903 opens the circuit over conductor 2071 in order to prevent a selection of wiper 2234 of the route control switch which controls the setting up of a subscriber connection to another zone.

When calls are set up by the operator to a local subscriber, relay 1620 is not operated and the selection of an appropriate wiper of the route control switch RCS is then effected from earth at armature 1741 after the setting of the switch TD1, armature 1622 in its resting position, wiper 2220 of the two directional switch TD1 to the bank contacts associated with this wiper. These bank contacts are connected to the appropriate ones of the wipers of the route control switch to enable the appropriate wiper to be selected in accordance with the setting of the switch TD1.

One further point should be noted in connection with the setting up of special service calls to another zone. These calls are designated by five or six digits only, and in order to ensure the correct operation of the intermediate circuits a code signal is automatically transmitted from the register-translator after the last of the coded digits. This is effected by connecting the next contact associated with the appropriate wiper of the route control switch to conductor 2077 so that a circuit is thus completed for relay 1680. Relay 1680 at armature 1681 closes an obvious circuit for relay 1690; at armature 1682 closes an obvious circuit for relay 1700 and at armature 1683 alters the circuits extending from the contacts of the counting relays 1750, 1760 and 1770 and over the contacts of relays 1810, 1820, 1830, 1840, 1850 and 1860 which circuits control the operation of relay 2150. By this means a coded signal comprising a cycle of four impulses of which the first three are effective in operating storage relays of the appropriate group in the intermediate equipment are transmitted. It will be seen by referring to Fig. 23 that this combination of impulses corresponds to no particular digit but serves to vary the operation of the intermediate circuits as explained in greater detail in my co-pending application Serial No. 743,964, filed April 25, 1947.

With regard to the variations introduced by the operation of armature 1683, it will be noted that since relays 1690 and 1700 are operated, earth will be extended over conductor 1 of the impulse control conductors to operate relay 1820 over its upper winding. When the first impulse of the cycle is to be transmitted no circuit will be completed for relay 2150 and hence an impulse will be transmitted over the positive conductor 1401. Further no circuit will exist for relay 2150 on the second impulse. So far the operation has been normal since the circuit has been set for controlling the transmission of the digit 1, and by referring to Fig. 23 it will be seen that for such a digit the first two relays of the appropriate storage group should be operated. On the third impulse the normal circuit for relay 2150 extends from earth at armature 1776, in its rest position, armature 1766 in its operated position 1766, armatures 1824, 1683, 1811, winding of relay 1250 to battery. This circuit however, is now opened at armature 1683 and hence no operation of relay 2150 occurs on the third impulse and consequently, this impulse is again transmitted over the positive conductor to cause the operation of the third relay of the appropriate storage group. The fourth impulse is transmitted over the negative conductor so that no storage relay is operated.

If the operator makes a mistake when she is setting up the called number, she operates the key K11 (Fig. 20) which extends earth over conductor 1172 (Figs. 20, 19, 16, 15 and 14) bank contact and wiper 2233, armature 1983, winding of relay 2040 to battery. Relay 2040 operates and at armature 2043 and its resting contact it opens the circuit of relay 1650 and at its locking contact it provides an additional holding circuit for relay 2060. Relay 1650 in releasing opens the locking circuit for the storage relays so that all these relays release. In addition relay 2040 at armature 2042 closes an obvious circuit for relay 2100 which operates and at armatures 2104 and 2105 opens the circuit to the group selector RTGS. The opening of this circuit is only effective if the switch TD1 has been set and armatures 1746 and 1747 are opened, since it is only necessary to open this circuit if the group selector has been operated. Finally relay 2040 at armature 2041 and its resting contact removes earth from conductor 1395 which extends to the guarding conductor of the group selector and at its working contact, relay 2040 completes a circuit for restoring the various switches to normal. Relay 1660 operates during this restoration and at armature 1664 completes a locking circuit for relay 2040 over armature 2044.

Thus on the operation of the key K11, the connection so far set up is released and the register-translator is restored to normal but owing to the continued operation of relay 2060, the register-translator is maintained in association with the operator's position and when relay 1660 releases dial tone is transmitted to the operator as previously described whereupon she proceeds again to set up the connection.

As previously pointed out a calling subscriber may set up a connection to the operator and have the toll call set up for him by the operator. In this case the switch IS is raised to the first or fourth level and then hunts for an idle relay group RG2. The seizure of this relay group causes the same sequence of operations to occur as described above except that the connection between the calling party and the operator is not released when the operator has obtained the particulars since she may proceed immediately with the setting up of the connection.

A further type of call which may be dealt with by the operator is a special service call. The selector IS is in this case raised to the 10th level and hunts for an idle special service selector SS. This selector then hunts over the selected level for an idle relay group such as the relay group RG3 (Figs. 1 and 21). When this is found battery is extended over conductor 3280 (Fig. 21) contacts associated with armature 3241, lower winding of relay 3260 to earth at contacts of armature 3245. In addition earth is extended over conductor 3281, contacts of armature 3242, armature 3201, lower winding of relay 3250 to battery. Relays 3250 and 3260 operate and relay 3250 at armature 3251 extends earth over armature 3234, key springs 3285, lamp 3289 to battery. The lamp 3289 is lighted to attract the attention of the operator. Relay 3260 in operating at armature 3261 closes a circuit from the tone lead 3284, condenser 3290, armature 3261, 3243, 3231, upper windings of relays 3260 and 3250 so that ring-back tone is transmitted to the calling party by induction over the lower windings of the relays. Finally relay 3260 at armature 3262 closes a circuit for slow-to-release relay 3270 which operates and at armature 3271 extends earth to the private conductor 3282.

When the operator inserts the plug P1 in the jack J3, earth at springs 3287 is extended over the winding of relay 3240 to battery. Relay 3240 operates and at armature 3244 closes a circuit for relay 3230. The circuit from the tone lead 3284 is now opened at armatures 3243 and 3231 and the circuit for the lamp 3289 at armature 3234. Further relay 3240 at armatures 3241 and 3242 reverses the battery connections to the speaking conductors.

Relay 3230 in operating at armature 3233 closes a circuit over the lower high-resistance winding of relay 3220, sleeve 3288 and thence to battery over the supervisory lamp 1154 in the cord circuit. Relay 3220 operates over this circuit but the supervisory lamp does not light. The operator now speaks to the calling party and provides him with the information or service he requires. At the end of conversation the calling party replaces his receiver and relays 3250 and 3260 release followed by relay 3270, earth being maintained on conductor 3282 over armatures 3244 and 3232. On releasing relay 3250 at armature 3251 extends earth over the upper low-resistance winding of relay 3220 to enable the supervisory lamp 1154 to light to give the operator an indication that the calling party has hung up. If the service is a chargeable one the operator now causes the operation of the calling party's meter by closing springs 3286 when slow-to-release relay 3210 operates and at armature 3212 connects booster battery from conductor 3283 to the private conductor 3282. The calling party's meter is thus operated. In addition relay 3210 at armature 3213 closes a circuit for slow-to-operate relay 3200 which locks over armature 3202 to earth at armature 3244 and at armature 3203 opens the circuit of relay 3210 which releases. Relay 3200 remains held to prevent further operation of the meter. The relay group RG3 is released by the withdrawal of the plug P1 from the jack J3.

It will be appreciated that while in the above description the calling party's number only has been displayed, it is also possible that the called party's number, if it has once been registered, is also displayed to assist the operator in setting up the connection.

Further while in the above description the calling party's number has been displayed only, it is also possible for it to be stored in the register sender so that the setting up of a subsequent connection to the calling party while initiated by the operator, is effected independently of her.

I claim:

1. In a telephone system in which items of record information pertaining to a connection set up from a calling line via a trunk to a called line are stored during the setting up of said connection and including means controlled in the event said connection is set up via said trunk to said called line for recording said stored items of record information; the combination comprising an operator position, means included in said connection and controlled responsive to a busy condition encountered on said trunk during the setting up of said connection, means governed by said last-mentioned means for automatically transferring said connection to said operator position, and means controllable from said operator position for answering said connection transferred thereto and for indicating said stored items of record information.

2. In a telephone system including switching apparatus operable to select an idle one of a plurality of trunks in setting up a connection from a calling line to a called line via the selected trunk and storage means controlled incident to the setting up of said connection to store certain items of record information pertaining thereto and including means controlled in the event said connection is completed via said selected trunk to said called line for operating a recorder to produce a record of said stored items; the combination comprising an operator position, means included in said connection and operated responsive to all of said trunks being busy at the time said switching apparatus is operated to select an idle one of said trunks, means governed by said last-mentioned means for automatically extending said connection from said calling line to said operator position, position storage means included in said last-mentioned connection, means controlled incident to the extension of said connection to said operator position for operating said position storage means in accordance with said stored items of information, an indicator, means operated responsive to the answer of said connection at said position, and means governed by said last-mentioned means for automatically controlling said indicator to indicate said items of information stored on said position storage means.

3. In a telephone system including switching apparatus operable to select an idle one of a plurality of routing trunks in setting up a connection from a calling line to a called line via the selected trunk and first storage means controlled incident to the setting up of said connection to store certain items of record information pertaining thereto and means for operating a recorder to record said stored items incident to said connection; the combination comprising an operator position, a storage trunk terminating in said position, means operated responsive to all of said routing trunks being busy at the time said switching apparatus is operated to select an idle one of said routing trunks, means governed by said last-mentioned means for automatically controlling said switching apparatus to select said storage trunk in order to set up said connection from said calling line to said operator position, second storage means included in said last-mentioned connection operated to store the said items of record information stored on said first storage means, an indicator, and means controlled by the operator at said position for operating said indicator in accordance with said items of record information stored on said second storage means.

4. In a telephone system including switching apparatus operable to select an idle one of a plurality of trunks in setting up a connection from a calling line to a called line via the selected trunk and register means controlled incident to said connection to register certain items of record information pertaining thereto and means in said selected idle trunk for storing therein said registered items of record information and for operating recording apparatus to record said stored items; the combination comprising an operator position, means included in said connection and operated responsive to all of said trunks being busy at the time said switching apparatus is operated to select an idle one of said trunks, means governed by said last-mentioned means for automatically setting up said connection from said calling line to said operator position, an indicator, and means at said operator position for operating said indicator to indicate said registered items of record information pertaining to said first-mentioned connection.

5. In a telephone system including switching apparatus operable to select an idle one of a plurality of trunks in setting up a connection from a calling line to a called line via the selected trunk and register means controlled incident to the setting up of said connection to register certain items of record information pertaining thereto and a first storage device included in said selected trunk for storing therein said items of record information transferred thereto from said register means and for operating recording apparatus to record said items of record information stored in said first storage device; the combination comprising a plurality of operator positions, means operated responsive to all of said trunks being busy at the time said switching apparatus is operated to select an idle one of said trunks, means governed by said last-mentioned means for automatically extending said connection from said calling line to each of said operator positions, a second storage device, means controlled incident to the extension of said connection to said operator positions for transferring said items of record information from said register means to said second storage device, an indicator individual to each of said operator positions, means controlled incident to the answering of said connection at one of said positions for automatically associating the said indicator individual to said answering operator position with said second storage device, means controlled responsive to said association, and means governed by said last-mentioned means for controlling said second storage device to operate said associated indicator to indicate said items of record information at said answering operator position 6. In a telephone system including switching apparatus operable to set up a connection from a calling line to a called line via a trunk and register means for registering the identification of said calling line and means controlled in the event said connection is set up from said calling line via said trunk for recording said registered identification of said calling line; the combination comprising an operator position, means included in said connection and controlled responsive to a busy condition encountered on said trunk during the setting up of said connection, means governed by said last-mentioned means for automatically transferring said connection to said operator position, and means controlled responsive to said transfer of said connection to said operator position for indicating thereat said registered identification of said calling line.

7. In a telephone system including switching apparatus operable to select an idle one of a plurality of trunks in setting up a connection from a calling line to a called line via the selected trunk and first storage means operated incident to the setting up of said connection for storing the number of said calling line and means controlled responsive to said connection for recording the number of the calling line stored in said first storage means the combination comprising an operator position, means operated responsive to all of said trunks being busy at the time said switching apparatus is operated to select an idle one of said trunks, means governed by said last-mentioned means for automatically setting up said connection from said calling line to said operator position, a second storage means included in said last-mentioned connection, means operated responsive to said last-mentioned connection from said calling line to said operator position for operating said second storage means to store said calling line number stored in said first storage means, an indicator at said operator position, and means controllable from said operator position for answering said connection and for automatically controlling said indicator to indicate the calling line number stored on said second storage means.

8. In a telephone system including switching apparatus operable to set up a connection from a first class calling line or a second class calling line via a trunk to a called line and automatic rate means for establishing a first rate item incident to the setting up of a connection from said first class calling line to said called line or a second rate item incident to the setting up of a connection from said second class calling line to said called line and register means for registering certain items of record information pertaining to a connection and recording apparatus operable to record said items of record information and said established rate item; the combination comprising storage means included in said trunk for storing said certain items of record information pertaining to said connection and said established first or second rate item transferred thereto from said rate establishing means and register means, means controlled responsive to a connection having an established first rate item, means governed by said last-mentioned means for operating said recorder to record said items of record information and said first rate item stored in said storage means, means controlled responsive to a connection having an established second rate item, means governed by said last-mentioned means for preventing operation of said recorder to record said items of record information and said second rate item stored in said storage means, an operator position, means controlled responsive to a busy condition encountered on said trunk during the setting up of said connection, means governed by said last-mentioned means for automatically transferring said connection to said operator position, an indicator, and means controlled from said operator position for answering said connection transferred thereto and for operating said indicator to indicate said registered items of record information if said first rate item is established incident to the setting up of said connection or for operating said indicator to indicate said second rate item if said second rate item is established incident to the setting up of said connection.

9. In a telephone system including switching apparatus operable to select an idle one of a plurality of trunks in setting up a connection from a first class calling station or a second class calling station via the selected trunk to a called line and first storage means for storing a first digit incident to a connection from said first class station and a second digit incident to a connection from said second class station and recording apparatus operable to record one of said digits; the combination comprising a second storage means in said trunk operated incident to said connection for storing said digit stored in said first storage means, means operated responsive to the termination of said connection and controlled in the event said first digit is stored in said second storage means for operating said recorder to record said first digit and controlled in the event said second digit is stored in said second storage means for preventing the operation of said recorder, an operator position, means operated responsive to all of said trunks being busy at the time said switching apparatus is operated to select an idle one of said trunks, means governed by said last-mentioned means for automatically extending said connection from said first class station or said second class station to said operator position, a third storage means included in said last-mentioned connection, means responsive to the extension of said last-mentioned connection to said operator position for transmitting the digit stored in said first storage means to said third storage means, an indicator at said operator position, means operated responsive to the answer of said connection at said operator position, means governed by said last-mentioned means for automatically controlling said indicator to indicate the digit stored in said third storage means only in the event the digit stored therein is said second digit.

10. In a telephone system including switching apparatus operable to set up connections from a first operator position or a calling line via a trunk to a called line and a storage device for storing the directory number of said calling line in the event said connection originated at said calling line or for storing an operator number in the event said connection originated at said first operator position and means operated responsive to the setting up of said connection to said called line for controlling a recorder to produce a record of the number stored on said storage device only in the event said call originated on said calling line, the combination comprising a second operator position, means controlled responsive to said trunk being busy at the time said switching apparatus is operated to set up either one of said connections to said called line, means governed by said last-mentioned means for automatically extending the said connection to said second operator position, means controlled responsive to the extension of either one of said connections to said second operator position, means governed by said last-mentioned means for indicating the number stored on said storage device.

11. In a telephone system including switching apparatus operable to set up a connection from a first operator position or a calling line via a trunk to a called line and a storage device for storing the directory number of said calling line in the event said connection originated at said calling line or for storing an arbitrary number in the event said connection originated at said first operator position and means operated responsive to the setting up of a connection to said called line via said trunk for operating a recorder to record said directory number stored on said storage device in the event said call originated on said calling line and for preventing operation of said recorder in the event said call originated at said first operator position; the combination comprising a second operator position, means controlled responsive to said trunk being busy at the time said switching apparatus is operated to set up either one of said connections to said called line, means governed by said last-mentioned means for automatically extending the said connection to said second operator position, means operated responsive to the extension of said connection to said second operator position, and means governed by said last-mentioned means for displaying either said calling line directory number or said arbitrary number stored in said storage device depending upon whether said call originated on said calling line or at said first operator position.

12. In a telephone system including switching apparatus operable to set up a connection from a first operator position or a calling line via a trunk to a called line and a storage device for storing the directory number of said calling line in the event said connection originated at said calling line or for storing an arbitrary number in the event said connection originated at said first operator position and means controlled in the event said connection is set up from said calling line via said trunk to said called line for recording the directory number of said calling line stored in said storage device and means controlled in the event said connection is set up from said first operator position via said trunk to said called line for preventing operation of said recording means; the combination comprising a second operator position, means controlled responsive to said trunk being busy at the time said switching apparatus is operated to set up either one of said connections to said called line, means governed by said last-mentioned means for automatically extending the said connection to said second operator position, means controlled responsive to the extension of said connection to said second operator position, and means governed by said last-mentioned means for displaying the particular number stored in said storage device.

13. In a telephone system including switching apparatus operable to extend connections from calling lines to different destinations and charge rate apparatus which is selectively operative to establish different charge rates applicable to said connections and dependent upon said destinations; the combination comprising a trunk including a register, means controlled responsive to the failure of said switching apparatus to extend one of said connections from a calling one of said lines to one of said destinations, means governed by said last-mentioned means for transferring said one connection to said trunk and for registering in said register the one of said charge rates applicable to said one connection, a tone source, an operator position, and means controlled in accordance with the value of said one charge rate registered in said register for selectively connecting said trunk to said tone source or to said operator position.

14. In a telephone system including switching apparatus operable to extend connections from a calling line via a first trunk to different destinations and charge rate apparatus which is selectively operative to establish different charge rates applicable to said connections and dependent upon said destinations; the combination comprising a second trunk including a register, means controllable responsive to the failure to set up said connection from said calling line via said first trunk to one of said destinations, means governed by said last-mentioned means for transferring said connection from said calling line to said second trunk and for registering in said register the one of said charge rates applicable to said one connection, an operator position, and means controlled in the event said one charge rate registered in said register is greater than a predetermined value for selectively establishing said connection from said calling line to said operator position and controlled in the event said one charge rate registered in said register is less than said predetermined value for selectively transmitting a busy signal to said calling line.

15. In a telephone system including switching apparatus operable to extend connections from calling lines to different destinations and charge rate apparatus which is selectively operative to establish different charge rates applicable to said connections and dependent upon said destinations and storage apparatus for storing the identification of the calling ones of said lines; the combination comprising a trunk including a register, means controlled responsive to the failure of said switching apparatus to extend one of said connections from a calling one of said lines to one of said destinations, means governed by said last-mentioned means for transferring said one connection to said trunk and for registering in said register the one of said charge rates applicable to said one connection, a tone source, an operator position, means controlled in accordance with the value of said one established charge rate registered in said register for selectively connecting said trunk to said tone source or to said operator position, and means controlled from said operator position for answering the said connection selectively connected thereto and for displaying the identification of the calling line involved in the said one connection and stored in said storage apparatus at said operator position.

16. In a telephone system including switching apparatus operable to extend a connection from a calling line via a selected trunk to a first or second called line and register means for registering certain items of record information pertaining to said connection and a first storage device automatically controlled incident to the setting up of said connection to store a first or a second digit depending upon the called line involved in said connection and a recorder; the combination comprising a second storage device in said trunk operated to store said registered items of record information and the digit stored on said first storage device, means included in said trunk and operated responsive to said connection for controlling said recorder to produce a record of said items of record information and the digit stored on said second storage device, an operator trunk, an operator position, means controlled responsive to the failure to set up said connection via said trunk to one of said called lines, means governed by said last-mentioned means for automatically extending said connection to said operator trunk, a third storage device, means operated responsive to the extension of said connection to said operator trunk, means governed by said last-mentioned means for storing in said third storage device the digit stored in said first storage device, means operated in the event the digit stored said third storage device is said first digit for completing said connection from said calling line via said operator trunk to said operator position, and means operated in the event the digit stored in said third storage device is said second digit for preventing the completion of said connection from said calling line via said operator trunk to said operator position and for transmitting a tone signal to said calling line.

17. In a telephone system including switching apparatus operable to extend a connection from a calling line via a selected trunk to a first or second called line and register means for registering certain items of record information pertaining to said connection and a first storage device automatically controlled incident to the setting up of said connection to store a first or a second digit depending upon the called line involved in said connection and a recorder; the combination comprising a second storage device in said trunk operated to store said registered items of record information and the digit stored on said first storage device, means included in said trunk and operated responsive to said connection for controlling said recorder to produce a record of said items of record information and the digit stored on said second storage device, an operator trunk, an operator position, means controlled responsive to said trunk being busy at the time said switching apparatus is operated to select said trunk, means governed by said last-mentioned means for automatically extending said connection to said operator trunk, a third storage device, means operated responsive to the extension of said connection to said operator trunk for storing in said third storage device the digit stored in said first storage device, means operated in the event the digit stored in said third storage device is said first digit for extending said connection from said calling line via said operator trunk to said operator position, means operated in the event the digit stored in said third storage device is said second digit for preventing the completion of said connection from said calling line via said operator trunk to said operator position and for transmitting a busy signal to said calling line, a fourth storage device, means for associating said fourth storage device with said operator trunk responsive to the extension of said connection to said operator position, and means thereafter controlled for storing in said fourth storage device said items of record information registered in said register means.

18. In a telephone system including switching apparatus operable to extend a connection from a calling line via a selected trunk to a first or second called line and register means for registering certain items of record information pertaining to said connection and a first storage device automatically controlled incident to the setting up of said connection to store a first or a second digit depending upon the called line involved in said connection and a recorder; the combination comprising a second storage device in said trunk operated to store said registered items of record information and the digit stored on said first storage device, means included in said trunk and operated responsive to the termination of said connection for controlling said recorder to produce a record of said items of record information and the digit stored on said second storage device, an operator trunk, an operator position, means controlled responsive to said trunk being busy at the time said switching apparatus is operated to select said trunk, means governed by said last-mentioned means for automatically extending said connection to said operator trunk, a third storage device, means operated responsive to the extension of said connection to said operator trunk for storing in said third storage device the digit stored in said first storage device, means operated in the event the digit stored in said third storage device is said first digit for extending said connection from said calling line via said operator trunk to said operator position, means operated in the event the digit stored in said third storage device is said second digit for preventing the completion of said connection from said calling line via said operator trunk to said operator position and for transmitting a busy signal to said calling line, a fourth storage device, means for associating said fourth storage device with said operator trunk responsive to the extension of said connection to said operator position, means thereafter controlled for storing in said fourth storage device and items of record information registered in said register means, an indicator, and means controlled from said operator position for answering said connection extended thereto and for controlling said fourth storage device to operate said indicator to indicate said items of record information pertaining to said connection stored on said fourth storage device.

19. In a telephone system including switching apparatus operable to set up a connection from a first operator position via a routing trunk to a called line and a storage device for storing a number identifying a connection from said first operator position; the combination comprising a second operator position, means automatically operated responsive to a busy condition encountered on said routing trunk during the setting up of said connection means governed by said last-mentioned means for transferring said connection to said second operator position, an indicator, and means controlled from said second operator position for answering said last-mentioned connection and for automatically controlling said indicator to indicate said stored number.

20. In a telephone system including switching apparatus operable to select a routing trunk in setting up a connection from a first operator position via said routing trunk to a called line and means controlled incident to the setting up of said connection for establishing an item identifying said first operator position; the combination comprising an operator trunk, a second operator position, means automatically operated responsive to said routing trunk being busy at the time said switching apparatus is operated to select said routing trunk, means governed by said last-mentioned means for automatically extending said connection from said first operator position via said operator trunk to said second operator position, an indicator, and means controlled from said second operator position for answering said last-mentioned connection and for automatically controlling said indicator to indicate said established item.

RUDOLPH FRANK STEHLIK.

REFERENCES CITED

The following references are of record in the file of this patent:

UNITED STATES PATENTS

| Number | Name | Date |
|---|---|---|
| 1,897,048 | Hatton | Feb. 14, 1933 |
| 2,224,696 | Raymond | Dec. 10, 1940 |
| 2,246,743 | Lomax et al. | June 24, 1941 |
| 2,337,642 | Bush | Dec. 28, 1943 |
| 2,338,242 | Heigh | Jan. 4, 1944 |
| 2,426,981 | Blake | Sept. 9, 1947 |

FOREIGN PATENTS

| Number | Country | Date |
|---|---|---|
| 392,288 | Great Britain | May 18, 1933 |
| 516,348 | Great Britian | Jan. 1, 1940 |
| 516,409 | Great Britain | Jan. 1, 1940 |
| 532,728 | Great Britain | Jan. 30, 1941 |